(12) United States Patent
Liu et al.

(10) Patent No.: US 12,373,127 B2
(45) Date of Patent: Jul. 29, 2025

(54) PROCESSOR, UFS CONTROL METHOD, AND COMPUTER SYSTEM

(71) Applicant: HUAWEI TECHNOLOGIES CO., LTD., Guangdong (CN)

(72) Inventors: Binfeng Liu, Shenzhen (CN); Guangyu Zhang, Beijing (CN); Tao Yang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/162,555

(22) Filed: Jan. 31, 2023

(65) Prior Publication Data

US 2023/0176774 A1    Jun. 8, 2023

Related U.S. Application Data

(63) Continuation of application No. PCT/CN2020/106320, filed on Jul. 31, 2020.

(51) Int. Cl.
*G06F 3/06* (2006.01)

(52) U.S. Cl.
CPC .......... *G06F 3/0655* (2013.01); *G06F 3/0604* (2013.01); *G06F 3/0679* (2013.01)

(58) Field of Classification Search
CPC ..... G06F 3/0655; G06F 3/0604; G06F 3/0679
See application file for complete search history.

(56) References Cited

U.S. PATENT DOCUMENTS

| 2015/0074338 | A1 | 3/2015 | Raviv et al. | |
|---|---|---|---|---|
| 2019/0166201 | A1* | 5/2019 | Choi | .................... H04L 67/1097 |
| 2021/0374079 | A1* | 12/2021 | Shin | ..................... G06F 13/1668 |

OTHER PUBLICATIONS

Extended European Search Report in European Appln. No. 20947671.2, mailed on Aug. 16, 2023, 6 pages.

* cited by examiner

*Primary Examiner* — Edward J Dudek, Jr.
(74) *Attorney, Agent, or Firm* — Fish & Richardson P.C.

(57) ABSTRACT

The present disclosure relates to processors, universal flash storage (UFS) control methods, and computer systems. One example processor includes a first processor core, a second processor core, a host controller register (HCI), and a service delivery subsystem (SDS). The HCI includes a first extended doorbell register and a second extended doorbell register. The first processor core may invoke, by using the first extended doorbell register, the HCI to provide first instruction information for the SDS, and the second processor core may invoke, by using the second extended doorbell register, the HCI to provide second instruction information for the SDS.

20 Claims, 8 Drawing Sheets

PROCESSOR, UFS CONTROL METHOD, AND COMPUTER SYSTEM

CROSS-REFERENCE TO RELATED APPLICATIONS

This application is a continuation of International Application No. PCT/CN2020/106320, filed on Jul. 31, 2020, the disclosure of which is hereby incorporated by reference in its entirety.

TECHNICAL FIELD

This application relates to the field of UFS technologies, and in particular, to a processor, a UFS control method, and a computer system.

BACKGROUND

A universal flash storage (UFS) interface is a next-generation universal storage interface, and has a simple structure and high performance. Therefore, the universal flash storage interface is widely used in electronic devices such as a mobile phone and a smart camera. A UFS interface of an electronic device is usually used as a data transmission interface between a processor and a mass storage device, to transfer files at a high speed.

A processor that supports a UFS interface may usually include a processor core, a host controller interface (HCI), and a service delivery subsystem (SDS). The processor core may invoke the HCI to deliver instruction information to the SDS. The SDS may further execute the instruction information. For example, a UFS interface circuit may read and write data in a storage device, manage storage space in the storage device, and the like based on the instruction information.

However, as people have increasingly higher requirements on performance of an electronic device, an increasing quantity of processor cores are integrated into a processor, and this processor is usually alternatively referred to as a multi-core processor. For a multi-core processor that supports a UFS interface, how a plurality of processor cores efficiently collaborate to enable the plurality of processor cores to efficiently invoke an HCI is an urgent problem to be resolved in the UFS interface field at present. Therefore, application of the UFS interface in the multi-core processor needs to be further studied.

SUMMARY

This application provides a processor, a UFS control method, and a computer system, to improve UFS access efficiency in a multi-core processor, and implement efficient and collaborative running of a plurality of processor cores.

According to a first aspect, an embodiment of this application provides a processor. The processor mainly includes a first processor core, a second processor core, a host controller register HCI, and a service delivery subsystem SDS. The HCI includes a first extended doorbell register and a second extended doorbell register. The first processor core may invoke, by using the first extended doorbell register, the HCI to provide first instruction information for the SDS, and the second processor core may invoke, by using the second extended doorbell register, the HCI to provide second instruction information for the SDS.

The processor provided in this embodiment of this application may be a system on chip (SoC) or another multi-core processing chip. The first processor core and the second processor core in the processor may be logic circuits that have operation and control functions, and can independently deliver and respond to various control commands. The first instruction information may be instruction information delivered by the first processor core by invoking the HCI, and the second instruction information may be instruction information delivered by the second processor core by invoking the HCI. It should be understood that both the first instruction information and the second instruction information may be UTRDs, and specific information content of the first instruction information and the second instruction information may be the same or may be different. For specific implementations of both the first instruction information and the second instruction information, refer to conventional instruction information. This is not limited in this embodiment of this application.

In the processor provided in this embodiment of this application, the first processor core and the second processor core respectively correspond to different extended doorbell registers. When the first processor core invokes the HCI by using the first extended doorbell register, the first processor core does not need to lock the first extended doorbell register, and the first processor core does not need to unlock the first extended doorbell register after the first processor core stops invoking. The first processor core does not need to wait for the second processor core to complete accessing the first extended doorbell register before accessing the first extended doorbell register. This is similar for the second processor core, and details are not described again. Therefore, in the processor provided in this embodiment of this application, the first processor core and the second processor core do not interfere with each other when invoking the HCI. This helps the first processor core and the second processor core efficiently invoke the HCI, and further helps improve UFS access efficiency.

It may be understood that the processor may include two or more processor cores. In a possible implementation, the processor may include a plurality of processor cores. The first processor core may be any one of the plurality of processor cores, and the second processor core may be any one of the plurality of processor cores other than the first processor core. The HCI may further include a plurality of extended doorbell registers, and the plurality of extended doorbell registers are in a one-to-one correspondence with the plurality of processor cores. The first extended doorbell register may be an extended doorbell register corresponding to the first processor core, and the second extended doorbell register may be an extended doorbell register corresponding to the second processor core.

The plurality of processor cores in the processor are in a one-to-one correspondence with the plurality of extended doorbell registers, and each processor core may invoke the HCI by using a corresponding extended doorbell register to deliver instruction information. In this implementation, the plurality of processor cores do not interfere with each other when accessing the extended doorbell register. This helps implement multi-core decoupling, and further helps improve UFS access efficiency of the processor.

In a current interrupt feedback architecture, the HCI can route interrupt information only to a specific processor core, and the interrupt information is managed together by the specific processor core. The interrupt information cannot be directly reported to a corresponding processor core for processing. The interrupt feedback process is complex, resulting in low interrupt response efficiency. In view of this, the HCI in this embodiment of this application may further include a first extended feedback register and a second extended feedback register. In this case, after the first processor core invokes, by using the first extended doorbell register, the HCI to provide the first instruction information for the SDS, the HCI may feed back first interrupt information to the first processor core by using the first extended feedback register after the SDS completes execution of the first instruction information. After the second processor core invokes, by using the second extended doorbell register, the HCI to provide the second instruction information for the SDS, the HCI may feed back second interrupt information to the second processor core by using the second extended feedback register after the SDS completes execution of the second instruction information.

The first interrupt information may be interrupt information generated after the SDS completes execution of the first instruction information delivered by the first processor core, and the second interrupt information may be interrupt information generated after the SDS completes execution of the second instruction information delivered by the second processor core. In this implementation, the first processor core and the second processor core each have a separate interrupt reporting channel, and the first interrupt information and the second interrupt information do not need to be managed together by a specific processor core. Therefore, this helps improve interrupt response efficiency.

To enable the first processor core and the second processor core to flexibly control a manner of feeding back interrupt information, in a possible implementation, the HCI may further include a first feedback switch register and a second feedback switch register. In this case, the first processor core may invoke, by using the first feedback switch register, the HCI to enable or disable the first extended feedback register, and the second processor core may invoke, by using the second feedback switch register, the HCI to enable or disable the second extended feedback register.

In this implementation, the first processor core and the second processor core can flexibly control the manner of feeding back the interrupt information. For example, when the first processor core has a high requirement on interrupt response efficiency, the first processor core may invoke, by using the first feedback switch register, the HCI to enable the corresponding first extended feedback register. The HCI may quickly feed back the first interrupt information to the first processor core by using the first extended feedback register. When the first processor has a low requirement on interrupt response efficiency, the first processor core may invoke, by using the first feedback switch register, the HCI to disable the corresponding first extended feedback register, and the HCI cannot quickly feed back the first interrupt information to the first processor core by using the first extended feedback register.

To adapt to the first extended doorbell register and the second extended doorbell register, in a possible implementation, the first extended doorbell register may correspond to first extended storage space in a memory, and the second extended doorbell register may correspond to second extended storage space in the memory. In this case, when the first processor core invokes, by using the first extended doorbell register, the HCI to provide the first instruction information for the SDS, the first processor core may write the first instruction information into the first extended storage space. The HCI may read the first instruction information from the first extended storage space, and provide the first instruction information for the SDS. When the second processor core invokes, by using the second extended doorbell register, the HCI to provide the second instruction information for the SDS, the second processor core may write the second instruction information into the second extended storage space. The HCI may read the second instruction information from the second extended storage space, and provide the second instruction information for the SDS.

To be compatible with a UFS protocol, in a possible implementation, the processor may include a plurality of processor cores. The plurality of processor cores include the first processor core and the second processor core. The HCI may further include a protocol doorbell register. The memory may further include protocol storage space corresponding to the protocol doorbell register. In this case, the HCI may receive, by using the protocol doorbell register, invocation of any one of the plurality of processor cores. The HCI may read, from the protocol storage space based on invocation of the any processor core, instruction information written by the any processor core, and provide the read instruction information for the SDS.

A specific invoking manner in which the plurality of processor cores in the processor invoke the HCI by using the protocol doorbell register complies with a specification of the UFS protocol, so that the processor provided in this embodiment of this application can still be compatible with the specification of the UFS protocol while improving UFS access efficiency.

It may be understood that the HCI can read the first instruction information and the second instruction information only by using address information of the first extended storage space and address information of the second extended storage space. Therefore, in a possible implementation, an address of the first extended storage space and an address of the second extended storage space are successively arranged after an address of the protocol storage space. The HCI further includes a protocol address register. The protocol address register is configured to store address information of the protocol storage space. In this case, when the HCI provides the first instruction information for the SDS, the HCI may obtain the address information of the first extended storage space through calculation based on the address information that is of the protocol storage space and that is stored in the protocol address register; read the first instruction information from the first extended storage space based on the address information of the first extended storage space; and provide the first instruction information for the SDS. When the HCI provides the second instruction information for the SDS, the HCI may obtain the address information of the second extended storage space through calculation based on the address information that is of the protocol storage space and that is stored in the protocol address register; read the second instruction information from the second extended storage space based on the address information of the second extended storage space; and provide the second instruction information for the SDS.

In this implementation, the HCI can access the protocol storage space and each extended storage space without additionally disposing another address register in the HCI. Therefore, this helps simplify a structure of the HCI.

In another possible implementation, the HCI may further include a first extended address register and a second extended address register. The first extended address register is configured to store address information of the first extended storage space. The second extended address register is configured to store address information of the second extended storage space. In this case, when the HCI provides the first instruction information for the SDS, the HCI may read the first instruction information from the first extended storage space based on the address information that is of the first extended storage space and that is in the first extended address register, and provide the first instruction information for the SDS. When the HCI provides the second instruction information for the SDS, the HCI may read the second instruction information from the second extended storage space based on the address information that is of the second extended storage space and that is in the second extended address register, and provide the second instruction information for the SDS.

In this implementation, an arrangement relationship between different storage space does not need to be limited, and therefore, a storage resource of the memory can be used more flexibly.

To enable the first processor core and the second processor core to more flexibly control an execution status of the instruction information, in a possible implementation, the HCI may further include a first clear register and a second clear register. In this case, the first processor core may invoke, by using the first clear register, the HCI to indicate the SDS to stop executing the first instruction information; and the second processor core may invoke, by using the second clear register, the HCI to indicate the SDS to stop executing the second instruction information.

In this implementation, the first processor core and the second processor core can flexibly control the execution status of the instruction information. For example, when one piece of first instruction information is not executed for a long time or execution of the first instruction information is not completed for a long time, the first processor core may invoke, by using the first clear register, the HCI to indicate the SDS to stop executing the first instruction information.

According to the foregoing extension of the doorbell register, that is, an extended doorbell register is additionally disposed in the HCI, an execution effect of the arbitration solution specified in the UFS protocol in the processor provided in this embodiment of this application is not ideal. In view of this, this embodiment of this application further provides the following several arbitration solutions that adapt to the processor. In a working process of the processor, any one of the following arbitration solutions may be used to determine to-be-executed invocation subsequently. For example, Arbitration Solution 1

The first extended doorbell register may include a plurality of invoking slots, the plurality of invoking slots correspond to priorities, and each invoking slot may receive invocation. In this case, when a plurality of invoking slots in the first extended doorbell register receive invocation, the HCI may sequentially execute, based on priorities corresponding to the plurality of invoking slots that receive invocation, invocation received by the plurality of invoking slots.

Arbitration Solution 2

The first extended doorbell register may include a plurality of invoking slots, and each invoking slot may receive invocation. In this case, the HCI may sequentially poll the plurality of invoking slots of the first extended doorbell register starting from a start invoking slot of the first extended doorbell register; after it is determined that any invoking slot receives invocation, execute invocation received by the any invoking slot; and use a next invoking slot of the any invoking slot as the start invoking slot, and continue to sequentially poll the plurality of invoking slots of the first extended doorbell register.

Arbitration Solution 3

A priority of the first extended doorbell register is higher than a priority of the second extended doorbell register. In this case, when both the first extended doorbell register and the second extended doorbell register receive invocation, the HCI may first execute invocation received by the first extended doorbell register, and then execute invocation received by the second extended doorbell register.

It should be understood that the arbitration solution 3 is for arbitration between extended doorbell registers, and the arbitration solution 1 and the arbitration solution 2 are for arbitration between a plurality of invoking slots inside the extended doorbell registers. Therefore, the arbitration solution 3 can be combined with the arbitration solution 1 or the arbitration solution 2.

Arbitration Solution 4

The first extended doorbell register and the second extended doorbell register each may include a plurality of invoking slots, and each invoking slot may receive invocation. In this case, the HCI may sequentially poll all invoking slots starting from a start invoking slot. All the invoking slots include invoking slots in the first extended doorbell register and the second extended doorbell register. After it is determined that any invoking slot receives invocation, the HCI executes invocation received by the any invoking slot. The HCI uses a next invoking slot of the any invoking slot as the start invoking slot, and continues to sequentially poll all the invoking slots.

Arbitration Solution 5

The first extended doorbell register and the second extended doorbell register each may include a plurality of invoking slots, and each invoking slot may receive invocation. In this case, when a plurality of invoking slots in all invoking slots receive invocation, the HCI may sequentially execute, based on a time sequence in which the plurality of invoking slots separately receive invocation, invocation separately received by the plurality of invoking slots. All the invoking slots may include invoking slots in the first extended doorbell register and the second extended doorbell register.

In a possible implementation, each of all the invoking slots may correspond to a sorting order. In this case, when a plurality of invoking slots receive invocation simultaneously, the HCI may preferentially execute invocation received by a first invoking slot. The first invoking slot may be an invoking slot that is in the plurality of invoking slots and that is closest to a sorting order of a start invoking slot. The start invoking slot may be a next invoking slot of an invoking slot corresponding to invocation last executed by the HCI.

To enable the first processor core and the second processor core to more flexibly control a specific manner of delivering instruction information, in a possible implementation, the HCI may further include a first doorbell switch register and a second doorbell switch register. In this case, the first processor core may invoke, by using the first doorbell switch register, the HCI to enable or disable the first extended doorbell register, and the second processor core may invoke, by using the second doorbell switch register, the HCI to enable or disable the second extended doorbell register.

According to a second aspect, an embodiment of this application further provides a UFS control method, and the method may be applied to the processor provided in any one of the first aspect. For a technical effect of a corresponding solution in the second aspect, refer to a technical effect that can be obtained by using the corresponding solution in the first aspect. Details are not described herein. For example, the processor mainly includes a first processor core, a second processor core, a host controller register HCI, and a service delivery subsystem SDS. The HCI includes a first extended doorbell register and a second extended doorbell register. The method mainly includes: The first processor core may invoke, by using the first extended doorbell register, the HCI to provide first instruction information for the SDS, and the second processor core may invoke, by using the second extended doorbell register, the HCI to provide second instruction information for the SDS.

It should be noted that, in this embodiment of this application, the processor may include a plurality of processor cores. The first processor core may be any one of the plurality of processor cores, and the second processor core may be any one of the plurality of processor cores other than the first processor core. The HCI may further include a plurality of extended doorbell registers, and the plurality of extended doorbell registers are in a one-to-one correspondence with the plurality of processor cores. The first extended doorbell register may be an extended doorbell register corresponding to the first processor core, and the second extended doorbell register may be an extended doorbell register corresponding to the second processor core.

To improve interrupt feedback efficiency, in a possible implementation, the HCI further includes a first extended feedback register and a second extended feedback register. In this case, after the first processor core invokes, by using the first extended doorbell register, the HCI to provide the first instruction information for the SDS, the HCI may feed back first interrupt information to the first processor core by using the first extended feedback register after the SDS completes execution of the first instruction information. After the second processor core invokes, by using the second extended doorbell register, the HCI to provide the second instruction information for the SDS, the HCI may feed back second interrupt information to the second processor core by using the second extended feedback register after the SDS completes execution of the second instruction information.

To enable the first processor core and the second processor core to flexibly control a manner of feeding back interrupt information, in a possible implementation, the HCI may further include a first feedback switch register and a second feedback switch register. In this case, the first processor core may invoke, by using the first feedback switch register, the HCI to enable or disable the first extended feedback register, and the second processor core may invoke, by using the second feedback switch register, the HCI to enable or disable the second extended feedback register.

To adapt to the first extended doorbell register and the second extended doorbell register, in a possible implementation, the first extended doorbell register may correspond to first extended storage space in a memory, and the second extended doorbell register may correspond to second extended storage space in the memory. In this case, when the first processor core invokes, by using the first extended doorbell register, the HCI to provide the first instruction information for the SDS, the first processor core may write the first instruction information into the first extended storage space. The HCI may read the first instruction information from the first extended storage space, and provide the first instruction information for the SDS. When the second processor core invokes, by using the second extended doorbell register, the HCI to provide the second instruction information for the SDS, the second processor core may write the second instruction information into the second extended storage space. The HCI may read the second instruction information from the second extended storage space, and provide the second instruction information for the SDS.

To be compatible with a UFS protocol, in a possible implementation, the processor may include a plurality of processor cores. The plurality of processor cores include the first processor core and the second processor core. The HCI may further include a protocol doorbell register. The memory may further include protocol storage space corresponding to the protocol doorbell register. In this case, the HCI may receive, by using the protocol doorbell register, invocation of any one of the plurality of processor cores. The HCI may read, from the protocol storage space based on invocation of the any processor core, instruction information written by the any processor core, and provide the read instruction information for the SDS.

It may be understood that the HCI can read the first instruction information and the second instruction information only by using address information of the first extended storage space and address information of the second extended storage space. Therefore, in a possible implementation, an address of the first extended storage space and an address of the second extended storage space are successively arranged after an address of the protocol storage space. The HCI further includes a protocol address register. The protocol address register is configured to store address information of the protocol storage space. In this case, when the HCI provides the first instruction information for the SDS, the HCI may obtain the address information of the first extended storage space through calculation based on the address information that is of the protocol storage space and that is stored in the protocol address register; read the first instruction information from the first extended storage space based on the address information of the first extended storage space; and provide the first instruction information for the SDS. When the HCI provides the second instruction information for the SDS, the HCI may obtain the address information of the second extended storage space through calculation based on the address information that is of the protocol storage space and that is stored in the protocol address register; read the second instruction information from the second extended storage space based on the address information of the second extended storage space; and provide the second instruction information for the SDS.

In another possible implementation, the HCI may further include a first extended address register and a second extended address register. The first extended address register is configured to store address information of the first extended storage space. The second extended address register is configured to store address information of the second extended storage space. In this case, when the HCI provides the first instruction information for the SDS, the HCI may read the first instruction information from the first extended storage space based on the address information that is of the first extended storage space and that is in the first extended address register, and provide the first instruction information for the SDS. When the HCI provides the second instruction information for the SDS, the HCI may read the second instruction information from the second extended storage space based on the address information that is of the second extended storage space and that is in the second extended address register, and provide the second instruction information for the SDS.

To enable the first processor core and the second processor core to more flexibly control a UFS interface, in a possible implementation, the HCI may further include a first clear register and a second clear register. In this case, the first processor core may invoke, by using the first clear register, the HCI to indicate the SDS to stop executing the first instruction information; and the second processor core may invoke, by using the second clear register, the HCI to indicate the SDS to stop executing the second instruction information.

According to the foregoing extension of the doorbell register, that is, an extended doorbell register is additionally disposed in the HCI, an execution effect of the arbitration solution specified in the UFS protocol in the processor provided in this embodiment of this application is not ideal. In view of this, this embodiment of this application further provides the following several arbitration solutions that adapt to the processor. In a working process of the processor, any one of the following arbitration solutions may be used to determine to-be-executed invocation subsequently. For example, Arbitration Solution 1

The first extended doorbell register may include a plurality of invoking slots, the plurality of invoking slots correspond to priorities, and each invoking slot may receive invocation. In this case, when a plurality of invoking slots in the first extended doorbell register receive invocation, the HCI may sequentially execute, based on priorities corresponding to the plurality of invoking slots that receive invocation, invocation received by the plurality of invoking slots.

Arbitration Solution 2

The first extended doorbell register may include a plurality of invoking slots, and each invoking slot may receive invocation. In this case, the HCI may sequentially poll the plurality of invoking slots of the first extended doorbell register starting from a start invoking slot of the first extended doorbell register; after it is determined that any invoking slot receives invocation, execute invocation received by the any invoking slot; and use a next invoking slot of the any invoking slot as the start invoking slot, and continue to sequentially poll the plurality of invoking slots of the first extended doorbell register.

Arbitration Solution 3

A priority of the first extended doorbell register is higher than a priority of the second extended doorbell register. In this case, when both the first extended doorbell register and the second extended doorbell register receive invocation, the HCI may first execute invocation received by the first extended doorbell register, and then execute invocation received by the second extended doorbell register.

It should be understood that the arbitration solution 3 is for arbitration between extended doorbell registers, and the arbitration solution 1 and the arbitration solution 2 are for arbitration between a plurality of invoking slots inside the extended doorbell registers. Therefore, the arbitration solution 3 can be combined with the arbitration solution 1 or the arbitration solution 2.

Arbitration Solution 4

The first extended doorbell register and the second extended doorbell register each may include a plurality of invoking slots, and each invoking slot may receive invocation. In this case, the HCI may sequentially poll all invoking slots starting from a start invoking slot. All the invoking slots include invoking slots in the first extended doorbell register and the second extended doorbell register. After it is determined that any invoking slot receives invocation, the HCI executes invocation received by the any invoking slot.

The HCI uses a next invoking slot of the any invoking slot as the start invoking slot, and continues to sequentially poll all the invoking slots.

Arbitration Solution 5

The first extended doorbell register and the second extended doorbell register each may include a plurality of invoking slots, and each invoking slot may receive invocation. In this case, when a plurality of invoking slots in all invoking slots receive invocation, the HCI may sequentially execute, based on a time sequence in which the plurality of invoking slots separately receive invocation, invocation separately received by the plurality of invoking slots. All the invoking slots may include invoking slots in the first extended doorbell register and the second extended doorbell register.

In a possible implementation, each of all the invoking slots may correspond to a sorting order. In this case, when a plurality of invoking slots receive invocation simultaneously, the HCI may preferentially execute invocation received by a first invoking slot. The first invoking slot may be an invoking slot that is in the plurality of invoking slots and that is closest to a sorting order of a start invoking slot. The start invoking slot may be a next invoking slot of an invoking slot corresponding to invocation last executed by the HCI.

To enable the first processor core and the second processor core to more flexibly control a specific manner of delivering instruction information, in a possible implementation, the HCI may further include a first doorbell switch register and a second doorbell switch register. In this case, the first processor core may invoke, by using the first doorbell switch register, the HCI to enable or disable the first extended doorbell register, and the second processor core may invoke, by using the second doorbell switch register, the HCI to enable or disable the second extended doorbell register.

According to a third aspect, an embodiment of this application further provides a computer system. The computer system mainly includes the processor provided in any one of the first aspect and a UFS peripheral, and an SDS in the processor is coupled to the UFS peripheral. For example, the computer system may be an electronic device such as a personal computer, a mobile phone, or a tablet, or may be a module (or a module group) such as a computer main board. The UFS peripheral may be a flash memory, a memory card, or the like.

These aspects or other aspects of this application are more readily apparent from the following description of embodiments.

DESCRIPTION OF EMBODIMENTS

To make the objectives, technical solutions, and advantages of this application clearer, the following further describes this application in detail with reference to the accompanying drawings. A specific operation method in a method embodiment may also be applied to an apparatus embodiment or a system embodiment. It should be noted that in description of this application, "at least one" means one or more, and "a plurality of" means two or more. In view of this, in embodiments of the present application, "a plurality of" may also be understood as "at least two". The term "and/or" describes an association relationship for describing associated objects and represents that three relationships may exist. For example, A and/or B may represent the following three cases: Only A exists, both A and B exist, and only B exists. In addition, the character "/" generally indicates an "or" relationship between the associated objects unless otherwise specified. In addition, it should be understood that, in the description of this application, terms such as "first" and "second" are merely used for distinguishing and description, but should not be understood as indicating or implying relative importance, or should not be understood as indicating or implying a sequence.

Figure 1:
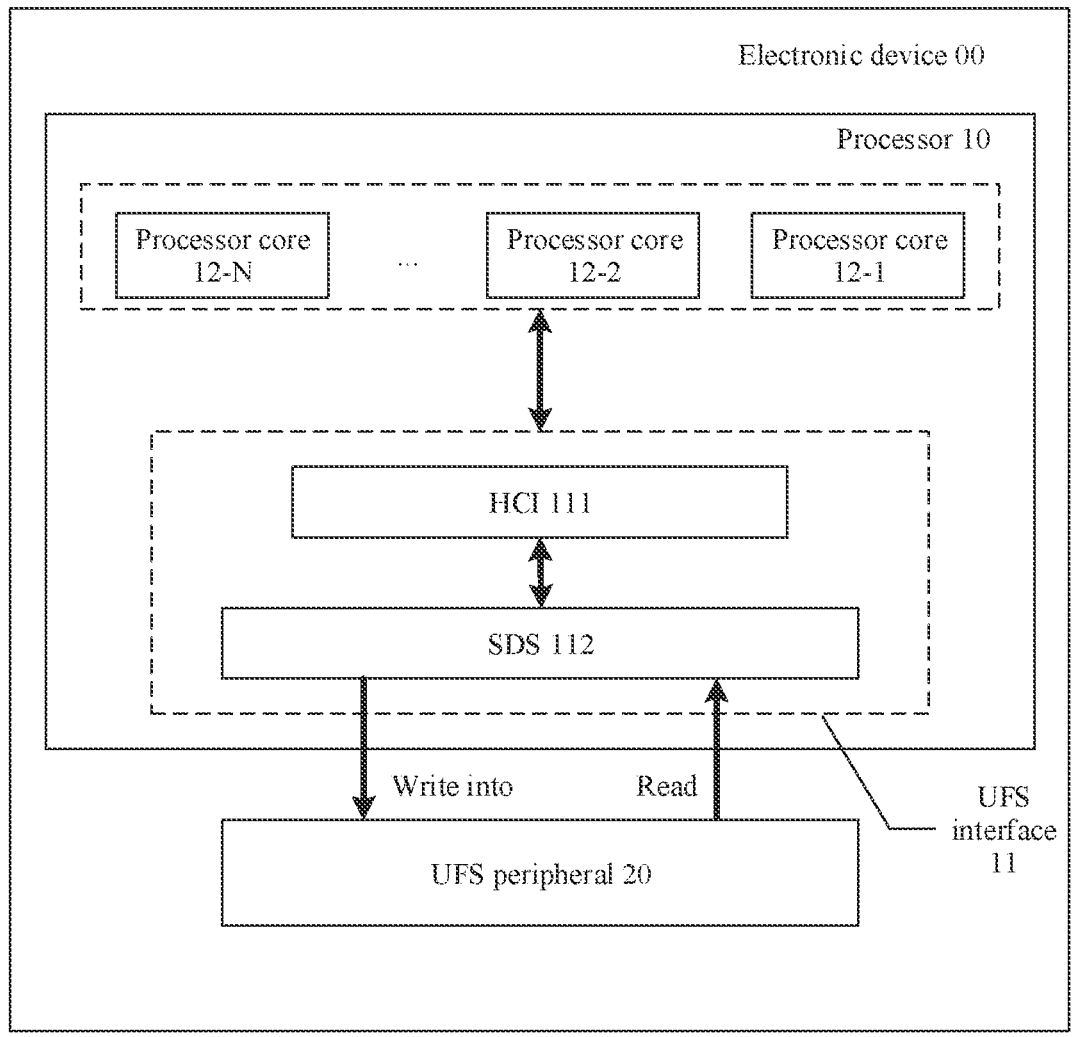
FIG. 1 is a schematic diagram of a structure of an electronic device.

A UFS interface is a next-generation universal storage interface in a processor, and the processor may be connected to a memory through the UFS interface. For example, an electronic device 00 shown in FIG. 1 mainly includes a processor 10 and a UFS peripheral 20. The processor 10 may be a system on chip (SoC) or another multi-core processing chip. As shown in FIG. 1, the processor 10 includes a UFS interface 11, and the UFS interface 11 is connected to the UFS peripheral 20. The UFS peripheral 20 may be a device coupled to the processor 10 through the UFS interface 11. For example, the UFS peripheral 20 may be a flash memory, a memory card, or the like. Details are not listed one by one in this embodiment of this application.

As shown in FIG. 1, the processor 10 further includes a plurality of processor cores (a processor core 12-1 to a processor core 12-N), and N is an integer greater than 1. In other words, the processor 11 is a multi-core processor. Each processor core may be a logic circuit (or module) having a logical operation and control function. A plurality of processor cores in the processor 11 may operate together, to improve an overall computing speed of the processor 11.

Specifically, as shown in FIG. 1, an HCI 111 and an SDS 112 are usually disposed in the UFS interface 11. The HCI 111 includes a plurality of types of registers, and different types of registers may accept different types of invocation. It may also be understood that different types of registers provide invocation channels with different functions.

Figure 2:
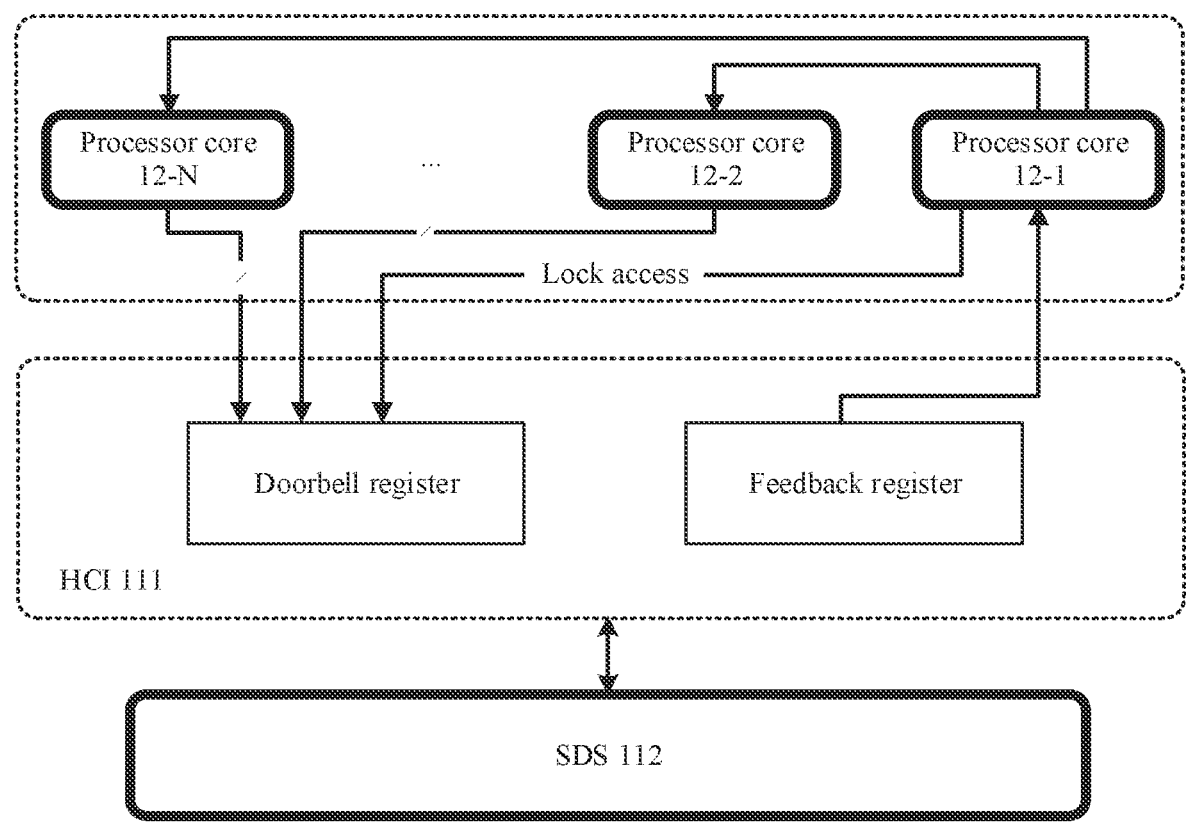
FIG. 2 is a schematic diagram of a structure of an HCI.

For example, as shown in FIG. 2, the HCI 111 may include a doorbell register. The doorbell register provides a task delivery channel for a plurality of processor cores, and each processor core may invoke the HCI 111 by using the doorbell register to deliver instruction information to the SDS 112.

The instruction information indicates the SDS 112 to perform data transmission. For example, when the SDS 112 executes the instruction information, the SDS 112 may read data from the UFS peripheral 20 or write data into the UFS peripheral 20 based on the instruction information. In a possible implementation, the instruction information may include a UFS transfer protocol transfer request descriptor (UTRD). For example, the SDS 112 mainly includes a unified protocol (UniPro) circuit and an M-physical interface (M-PHY) circuit. For specific implementation of the UniPro circuit and the M-PHY circuit, refer to the UniPro protocol and the M-PHY protocol. Details are not described herein again.

Generally, a current multi-core processor mostly uses a "lock access" invocation manner, so that the plurality of processor cores can collaboratively invoke the HCI 111 by using a same doorbell register. The processor core 12-1 is used as an example. When invoking the HCI 111 by using the doorbell register, the processor core 12-1 locks the doorbell register. In this case, another processor core cannot access the doorbell register.

The processor core 12-1 first traverses 32 invoking slots in the doorbell register, and determines, from the 32 invoking slots, an invoking slot that is not occupied by another processor core as a target invoking slot. A level of the unoccupied invoking slot is 0, and a level of an occupied invoking slot is 1.

The processor core 12-1 sets a level of the target invoking slot to up, that is, sets the level of the target invoking slot from 0 to 1. In this way, the target invoking slot is occupied, and invoking of the HCI 111 is initiated, so that the HCI 111 is invoked to deliver instruction information to the SDS 112. The instruction information may instruct the SDS 112 to access the UFS peripheral 20, for example, may indicate the UFS peripheral 20 to read or write data.

The processor core 12-1 unlocks the doorbell register, so that another processor core can also access the doorbell register. A specific implementation in which another processor core invokes the HCI 111 by using the doorbell register is similar to that of the processor core 12-1, and details are not described herein again.

Although a "lock access" invocation manner may avoid an invoking conflict between different processor cores to some extent, a long time needs to be spent in a lock and unlock process when the HCI 111 is invoked. This delays average time of sending instruction information to the SDS 112, and is not conducive to improving UFS access efficiency. The UFS access efficiency may be understood as efficiency of accessing the UFS peripheral 20 by the processor 10 through the UFS interface 11. In addition, when one processor accesses the doorbell register, another processor cannot access the doorbell register. This is not conducive to improving UFS access efficiency.

In view of this, an embodiment of this application provides a processor. The processor may be a multi-core processor, and may be applied to an SoC or another multi-core processing chip. Compared with a conventional processor (the processor 10), a plurality of extended doorbell registers are additionally disposed in the processor provided in this embodiment of this application, so that different processor cores separately invoke the HCI by using different extended doorbell registers, to avoid an invoking conflict between different processor cores. In addition, different processor cores do not need to lock or unlock the extended doorbell register when accessing the extended doorbell register, and do not need to wait for another processor core to complete accessing the extended doorbell register before accessing the extended doorbell register. Therefore, UFS access efficiency is further improved.

Figure 3:
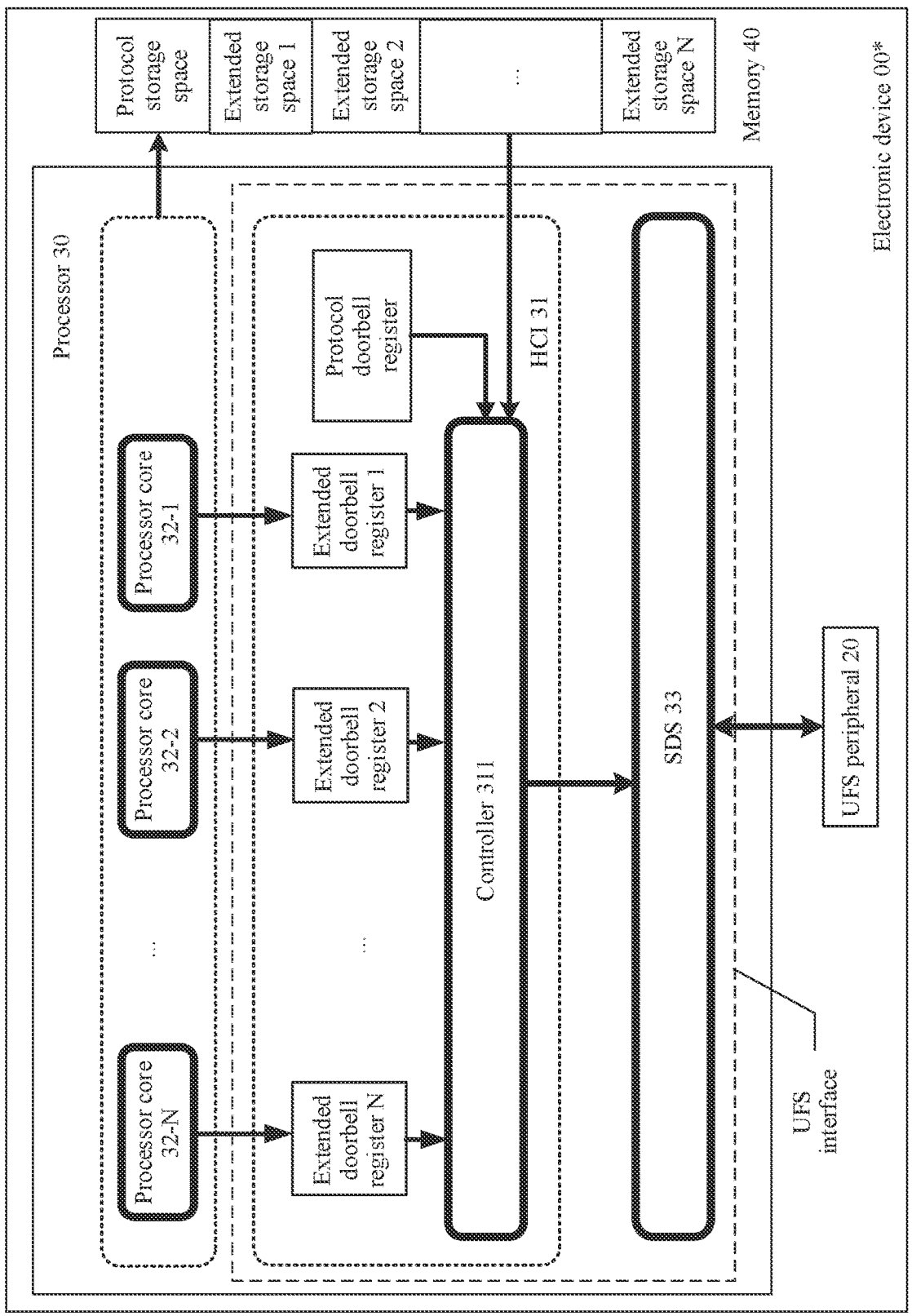
FIG. 3 is a schematic diagram of a structure of an electronic device according to an embodiment of this application.

For example, in the electronic device 00\* shown in FIG. 3, the processor 30 includes a processor core 32-1 (a first processor core), a processor core 32-2 (a second processor core), an HCI 31, and an SDS 33. The HCI 31 includes an extended doorbell register 1 (a first extended doorbell register) and an extended doorbell register 2 (a second extended doorbell register).

The processor core 32-1 may invoke, by using the extended doorbell register 1, the HCI 31 to provide instruction information 1 for the SDS 33, and the processor core 32-2 may invoke, by using the extended doorbell register 2, the HCI 31 to provide instruction information 2 for the SDS 33. The extended doorbell register may alternatively be referred to as a UFS transfer protocol transfer request page table doorbell register (UTRLDBR).

In this embodiment of this application, both the processor core 32-1 and the processor core 32-2 may be logic circuits that have operation and control functions, and can independently deliver and respond to various control commands. The instruction information 1 may be instruction information delivered by the processor core 32-1 by invoking the HCI 31, and the instruction information 2 may be instruction information delivered by the processor core 32-2 by invoking the HCI 31. It should be understood that both the instruction information 1 and the instruction information 2 may be UTRDs, and information content of the instruction information 1 and the instruction information 2 may be the same or different. For specific implementations of the instruction information 1 and the instruction information 2, refer to conventional instruction information. This is not limited in this embodiment of this application.

The HCI 31 may provide the instruction information 1 for the SDS 33 based on invocation received by the extended doorbell register 1, and provide the instruction information 2 for the SDS 33 based on invocation received by the extended doorbell register 2. The SDS 33 may execute the instruction information 1 and the instruction information 2. For a specific implementation form thereof, refer to the UFS protocol. Details are not described herein again.

In the processor 30 provided in this embodiment of this application, the processor core 32-1 and the processor core 32-2 respectively correspond to different extended doorbell registers. When the processor core 32-1 invokes the HCI 31 by using the extended doorbell register 1, the processor core 32-1 does not need to lock the extended doorbell register 1, the processor core 32-1 does not need to unlock the extended doorbell register 1 after the processor core 32-1 stops invoking, and the processor core 32-1 does not need to wait for the processor core 32-2 to complete accessing the extended doorbell register 1 before accessing the extended doorbell register 1. This is similar for the processor core 32-2, and details are not described again.

Therefore, in the processor 30 provided in this embodiment of this application, the processor core 32-1 and the processor core 32-2 do not interfere with each other when invoking the HCI 31. This helps the processor core 32-1 and the processor core 32-2 efficiently invoke the HCI 31, and further helps improve UFS access efficiency.

It may be understood that the processor 30 may include two or more processor cores. In a possible implementation, the processor 30 may include a plurality of processor cores and a plurality of extended doorbell registers. For example, as shown in FIG. 3, the processor 30 includes N processor cores (a processor core 12-1 to a processor core 12-N) and N extended doorbell registers (an extended doorbell register 1 to an extended doorbell register N), and N is an integer greater than 1.

The N processor cores are in a one-to-one correspondence with the N extended doorbell registers, and each processor core may invoke the HCI 31 by using a corresponding extended doorbell register to deliver instruction information. Specifically, the processor core 12-1 may invoke the HCI 31 by using the extended doorbell register 1 to deliver the instruction information 1, the processor core 12-2 may invoke the HCI 31 by using the extended doorbell register 2 to deliver the instruction information 2, . . . , and the processor core 12-N may invoke the HCI 31 by using the extended doorbell register N to deliver instruction information N. In this implementation, the N processor cores do not interfere with each other when accessing the extended doorbell register. This helps implement multi-core decoupling, and further helps improve UFS access efficiency of the processor 30.

For ease of understanding, unless otherwise specified subsequently, the N processor cores and the N extended doorbell registers are used as an example for description in this embodiment of this application. It should be noted that, in this embodiment of this application, the processor 30 may further include another processor core in addition to the N processor cores, and the another processor core may invoke the HCI 31 in another manner (for example, lock access). This case should also be included in this embodiment of this application.

The HCI 31 may execute invocation received by the N extended doorbell registers, and provide instruction information for the SDS 33. Specifically, as shown in FIG. 3, the HCI 31 not only includes the N extended doorbell registers, but also includes a controller 311. For example, the controller 311 may be an application-specific integrated circuit (ASIC), a field programmable gate array (FPGA) or another programmable logic device, a transistor logic device, a hardware component, or any combination thereof.

In the HCI 31 provided in this embodiment of this application, the HCI 31 may perform, by using the controller 311, invocation received by the N extended doorbell registers. Specifically, as shown in FIG. 3, the electronic device 00* in which the processor 30 is located may further include a memory 40. The memory 40 may include N extended storage space (extended storage space 1 to extended storage space N), and the N extended storage space corresponds to N processor cores.

In this case, each processor core may write instruction information into extended storage space corresponding to the processor core. For example, the processor core 32-1 may write instruction information 1 into extended storage space 1 corresponding to the processor core 32-1, the processor core 32-2 may write instruction information 2 into extended storage space 2 corresponding to the processor core 32-2, . . . , and the processor core 32-N may write instruction information N into extended storage space N corresponding to the processor core 32-N.

It should be noted that there is also a correspondence between the N extended doorbell registers in the HCI 31 and the N extended storage space in the memory 40, and a correspondence between each extended doorbell register and extended storage space is determined based on a correspondence between a processor core corresponding to the extended doorbell register and the extended storage space. That is, there is a correspondence between the N extended doorbell registers, the N extended storage space, and the N processor cores. For example, there is a correspondence between the processor core 32-1 and the extended doorbell register 1 and the extended storage space 1, and there is also a correspondence between the extended doorbell register 1 and the processor core 32-1 and the extended storage space 1.

In view of this, the processor core 32-1 may write the instruction information 1 into the corresponding extended storage space 1 based on a correspondence between the processor core and the extended storage space, and invoke the HCI 31 by using the extended doorbell register 1. After the extended doorbell register 1 receives invocation, the controller 311 may read the instruction information 1 from the extended storage space 1 in the memory 40 based on a correspondence between the extended doorbell register and the extended storage space, to provide the instruction information 1 for the SDS 33.

In a possible implementation, as shown in FIG. 3, the HCI 31 may further include a protocol doorbell register, and the memory 40 may further include protocol storage space. In this case, each processor core in the processor 30 may invoke the HCI 31 by using the protocol doorbell register, and each processor core may also write instruction information into the protocol storage space.

When receiving invocation of any processor core by using the protocol doorbell register, the HCI 31 may read, from the protocol storage space based on invocation of the any processor core, instruction information written by the any processor core, and provide the read instruction information for the SDS 33.

A specific invoking manner in which the N processor cores invoke the HCI 31 by using the protocol doorbell register complies with a specification of the UFS protocol, so that the processor 30 provided in this embodiment of this application can still be compatible with the specification of the UFS protocol while improving UFS access efficiency.

Generally, each extended doorbell register may include a plurality of invoking slots. For example, a quantity of invoking slots in each extended doorbell register usually does not exceed 32. When each processor core invokes the HCI 31 by using a corresponding extended doorbell register, each time invoking is initiated, one invoking slot in the corresponding extended doorbell register is occupied.

Figure 4:
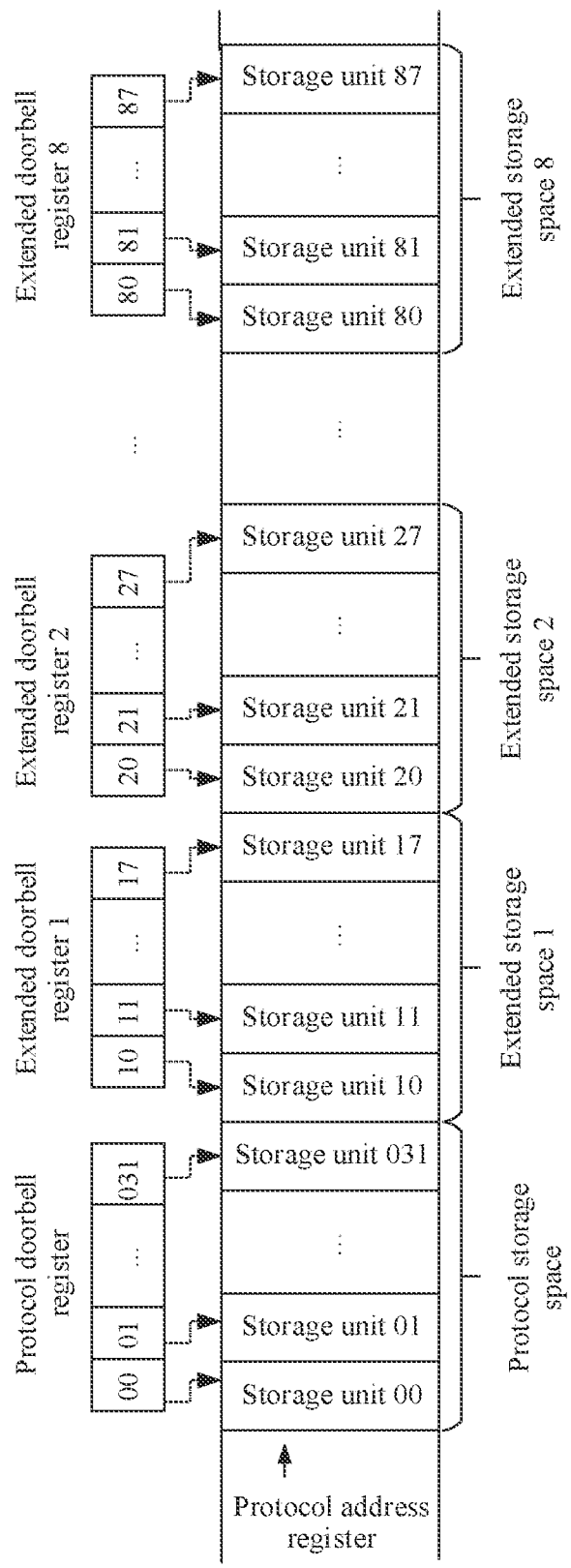
FIG. 4 is a schematic diagram of a correspondence between an extended doorbell register and extended storage space according to an embodiment of this application.

Correspondingly, each extended storage space may alternatively include a plurality of storage units, and the plurality of storage units in each extended storage space are in a one-to-one correspondence with the plurality of invoking slots in the extended doorbell register corresponding to each extended storage space. For example, as shown in FIG. 4, from an extended doorbell register 1 to an extended doorbell register 8 (N=8), each extended doorbell register includes eight invoking slots. Correspondingly, from extended storage space 1 to extended storage space 8, each extended storage space includes eight storage units.

Eight storage units (a storage unit 10 to a storage unit 17) in the extended storage space 1 are respectively in a one-to-one correspondence with eight invoking slots (an invoking slot 10 to an invoking slot 17) in the extended doorbell register 1, and eight storage units (a storage unit 20 to a storage unit 27) in extended storage space 2 are respectively in a one-to-one correspondence with eight invoking slots (an invoking slot 20 to an invoking slot 27) in an extended doorbell register 2. A correspondence between another invoking slot and another storage unit may be deduced by analogy, and details are not described herein again.

The processor core 32-1 is used as an example. The processor core 32-1 may first determine, from the extended doorbell register 1, an invoking slot with a 0 level, for example, an invoking slot 11. The processor core 32-1 may write to-be-delivered instruction information 1a into a storage unit 11 corresponding to the invoking slot 11, and set the level of the invoking slot 11 to 1.

After the level of the invoking slot 11 is set to 1, the HCI 31 may read the instruction information 1a from the storage unit 11 in the extended storage space 1 based on a relationship between the extended doorbell register and the extended storage space and a correspondence between the invoking slot and the storage unit. The HCI 31 may further provide the instruction information 1a for the SDS 33.

In this embodiment of this application, the protocol doorbell register may comply with a specification of the UFS protocol for the doorbell register. Specifically, according to the specification of the UFS protocol, the protocol doorbell register may usually include 32 invoking slots. When each processor core invokes the HCI 31 by using the protocol doorbell register, each time invoking is initiated, one invoking slot in the protocol doorbell register is occupied.

For example, as shown in FIG. 4, the HCI 31 includes a protocol doorbell register, and the protocol doorbell register includes 32 invoking slots. Correspondingly, protocol storage space includes 32 storage units, and the 32 storage units are in a one-to-one correspondence with the invoking slots in the protocol doorbell register. Before invoking the HCI 31 by using the protocol doorbell register, each processor core may first determine a 0-level invoking slot in the protocol doorbell register, and write instruction information that needs to be delivered into a storage unit corresponding to the 0-level invoking slot, so that the HCI 31 may be invoked by using the 0-level invoking slot.

It should be understood that, in addition to the foregoing N extended doorbell registers, the HCI 31 may further include another type of register. For example, the HCI 31 further includes a clear register, an extended feedback register, a feedback switch register, an address register, and the like. The following separately describes these registers by using further examples.

1. Address Register

It may be understood that, before reading instruction information from any extended storage space, the HCI 31 needs to first obtain address information of the extended storage space. In view of this, the HCI 31 may further include a protocol address register, and the protocol address register may alternatively be referred to as a UFS transfer protocol transfer request page table base address (UTRLBA) register. The protocol address register may store address information of the protocol storage space in the memory 40.

In a possible implementation, as shown in FIG. 3, the extended storage space 1 to the extended storage space N in the memory 40 are sequentially and consecutively arranged after the protocol storage space. Therefore, storage addresses from the protocol storage space to the extended storage space N are consecutive. In other words, after obtaining the address information of the protocol storage space, the HCI 31 may obtain address information of another storage space through calculation based on the address information of the protocol storage space, a size of the protocol storage space, and a size of each extended storage space.

For example, the HCI 31 receives invocation of the processor core 32-2 by using the extended doorbell register 2. In this case, the HCI 31 may obtain the address information of the protocol storage space from the protocol address register. In this way, the HCI 31 may obtain address information of the extended storage space 2 through calculation based on the address information of the protocol storage space and sizes of the protocol storage space and the extended storage space 1. Afterward, the HCI 31 may read, from the extended storage space 2 based on the address information of the extended storage space 2, the instruction information 2 written by the processor core 32-2.

Figure 5:
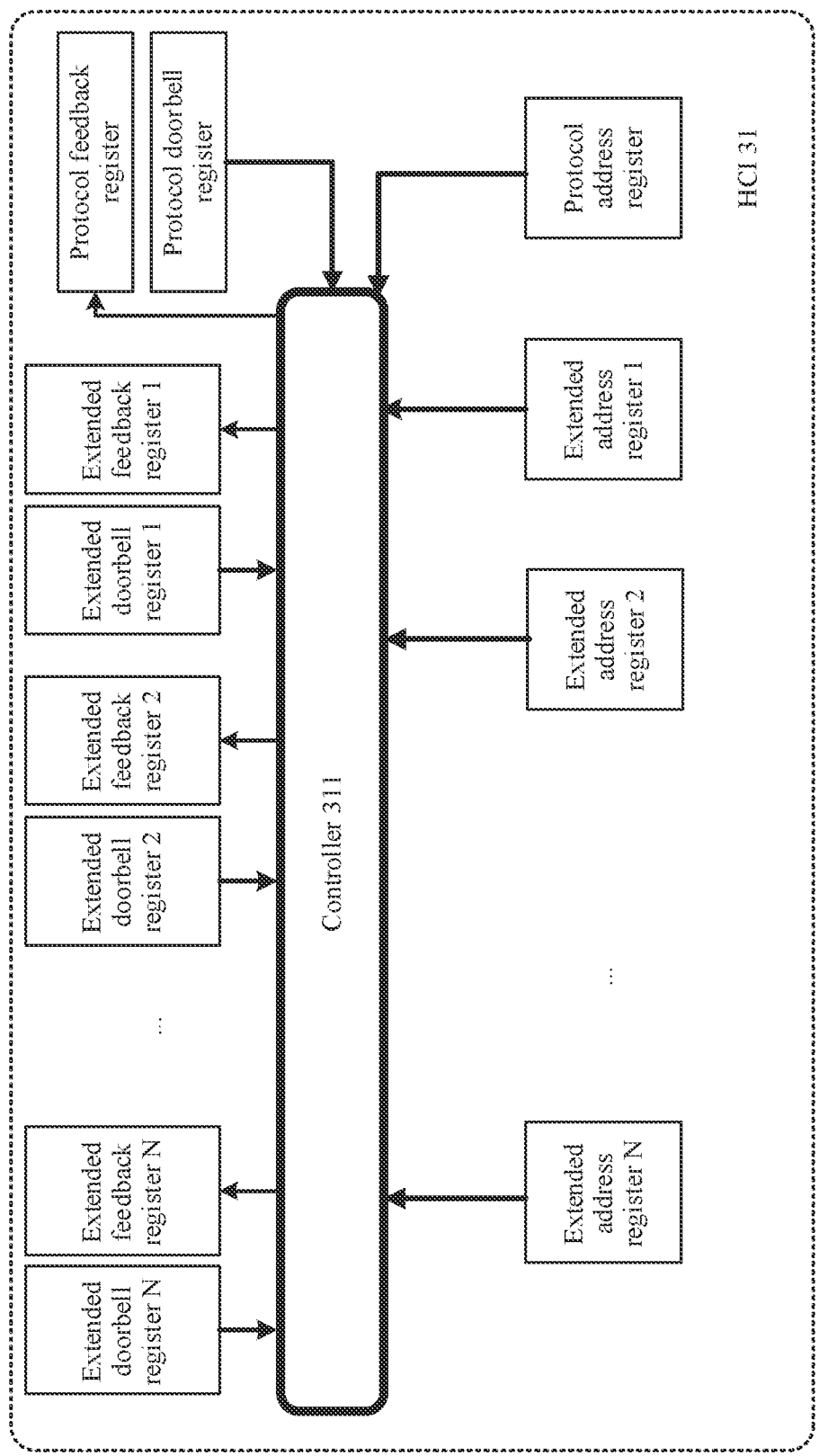
FIG. 5 is a schematic diagram of a structure of an HCI according to an embodiment of this application.

In another possible implementation, as shown in FIG. 5, the HCI 31 may include N extended address registers (an extended address register 1 to an extended address register N). The N extended address registers respectively correspond to the extended storage space 1 to the extended storage space N in the memory 40, and any extended address register may store address information of extended storage space corresponding to the extended address register. For example, the extended address register 1 may store address information of the extended storage space 1, the extended address register 2 may store address information of the extended storage space 2, . . . , and the extended address register N may store address information of the extended storage space N.

An extended address register corresponding to the processor core 32-$n$ may include a UFS transfer protocol transfer request page table base address (UFS transfer protocol transfer request list base address for core n, UTRLBA_C_n) register for a core n, and n is a number of the processor core. In this embodiment of this application, a value of n may be 1, or may be N, or may be any integer between 1 and N.

It should be noted that, when a quantity of bits of the address information is too large, and it indicates that complete address information cannot be stored by using one extended address register, the extended address register corresponding to the processor core 32-$n$ may further include a UFS transfer protocol transfer request page table base address additional (UFS transfer protocol transfer request list base address upper for core n, UTRLBAU_C_n) register for the core n.

Using an extended address register 1 as an example, the extended address memory 1 includes a UTRLBA_C_1 register and a UTRLBAU_C_1 register. Both the UTRLBA_C_1 register and the UTRLBAU_C_1 register store address information of the extended storage space 1.

After receiving invocation by using any extended doorbell register, the HCI 31 may obtain address information from an extended address register corresponding to the any extended doorbell register, and then read, based on the address information, the instruction information from extended storage space corresponding to the any extended doorbell register. For example, after receiving invocation by using the extended doorbell register 1, the HCI 31 may obtain address information from the extended address register 1 corresponding to the extended doorbell register 1, and read the instruction information 1 from the extended storage space 1 based on the address information. In this implementation, an arrangement relationship between different storage space does not need to be limited, and therefore, a storage resource of the memory 40 can be used more flexibly.

It should be noted that a quantity of extended address registers in the HCI 31 may alternatively be less than N. For example, the extended storage space 1 and the extended storage space 2 are sequentially arranged after the protocol storage space, and an arrangement sequence of the extended storage space 3 to the extended storage space N is not limited. In this case, the HCI 31 may include an extended address register 3 to an extended address register N, which are respectively configured to store address information of the extended storage space 3 to the extended storage space N. Address information of the extended storage space 1 and the extended storage space 2 may be obtained through calculation based on the address information of the protocol storage space.

2. Extended Feedback Register

According to the specification of the UFS protocol, an HCI in a UFS interface can also provide an interrupt feedback channel. As shown in FIG. 2, the HCI 111 may further include a feedback register, and the HCI 111 may feed back interrupt information to a specific processor core by using the feedback register.

Specifically, after completing execution of instruction information, the SDS 112 may generate interrupt information. The interrupt information indicates that the SDS 112 completes execution of one piece of instruction information. The HCI 111 may receive the interrupt information generated by the SDS 112, and feed back the interrupt information to a specific processor core by using the feedback register.

It should be noted that the processor core that receives the interrupt information is a specific processor core, such as the processor core 12-1. The HCI 111 may feed back the interrupt information to the processor core 12-1 by using the feedback register, and the processor core 12-1 forwards the interrupt information to another processor core.

Generally, the processor core 12-1 may determine instruction information corresponding to the interrupt information. For example, if the interrupt information is generated after the SDS 112 completes execution of instruction information 2, it may be determined that the instruction information corresponding to the interrupt information is the instruction information 2. The processor core 12-1 may forward the interrupt information to a processor core that delivers the instruction information 2. For example, if the instruction information 2 is instruction information delivered by the processor core 12-2, the processor core 12-1 may forward the interrupt information to the processor core 12-2.

It can be seen that, in the current interrupt feedback architecture, the HCI 111 can route interrupt information only to a specific processor core, and the interrupt information is managed together by the specific processor core. The interrupt information cannot be directly reported to a corresponding processor core for processing. The interrupt feedback process is complex, resulting in low interrupt response efficiency.

In view of this, the HCI 31 in this embodiment of this application may further include N extended feedback registers. As shown in FIG. 5, the HCI 31 includes N extended feedback registers (an extended feedback register 1 to an extended feedback register N). In addition, the N extended feedback registers respectively correspond to the N processor cores. For example, the extended feedback register 1 corresponds to a processor core 32-1, the extended feedback register 2 corresponds to a processor core 32-2, . . . , and the extended feedback register N corresponds to a processor core 32-N.

The extended feedback register corresponding to the processor core 32-$n$ may alternatively be referred to as a UFS transfer protocol transfer request list interrupt status (UFS transfer protocol transfer request list interrupt status for core n, UTRLIS_C_n) register for a core n.

In this embodiment of this application, the HCI 31 may feed back interrupt information 1 to the processor core 32-1 by using the extended feedback register 1, feed back interrupt information 2 to the processor core 32-2 by using the extended feedback register 2, . . . , and feed back interrupt information N to the processor core 32-N by using the extended feedback register N.

The interrupt information 1 is interrupt information generated after the SDS executes the instruction information 1 delivered by the processor core 32-1, the interrupt information 2 is interrupt information generated after the SDS executes the instruction information 2 delivered by the processor core 32-1, ..., and the interrupt information N is interrupt information generated after the SDS completes executing the instruction information N delivered by the processor cores 32-N.

In this implementation, each processor core has an independent interrupt reporting channel, and interrupt information does not need to be managed together by a specific processor core. Therefore, this helps improve interrupt response efficiency.

In a possible implementation, as shown in FIG. 5, the HCI 31 may further include a protocol feedback register. The HCI 31 may feed back interrupt information to a specific processor core by using the protocol feedback register, and the interrupt information is managed together by using the specific processor core. In other words, the HCI 31 may report the interrupt information by using the protocol feedback register according to the UFS protocol, so that the processor 30 provided in this embodiment of this application can be compatible with the UFS protocol.

It should be noted that the quantity of extended feedback registers in the HCI 31 may alternatively be less than N. For example, the HCI 31 includes only an extended feedback register 1 and an extended feedback register 2. In this case, the HCI 31 may feed back interrupt information 1 to the processor core 32-1 by using the extended feedback register 1, and feed back interrupt information 2 to the processor core 32-2 by using the extended feedback register 2. For interrupt information corresponding to other processor cores (the processor core 32-3 to the processor core 32-N), the HCI 31 may feed back the interrupt information to the other processor cores by using the protocol feedback register according to the UFS protocol. For ease of understanding, in this embodiment of this application, N extended feedback registers are used as an example for description.

3. Feedback Switch Register

In a possible implementation, the HCI 31 may further include N feedback switch registers. The N feedback switch registers correspond to the N processor cores. Each processor core may invoke, by using a corresponding feedback switch register, the HCI 31 to enable or disable a corresponding extended feedback register. For example, the processor core 32-1 may invoke, by using a feedback switch register 1, the HCI 31 to enable or disable the extended feedback register 1, and the processor core 32-2 may invoke, by using a feedback switch register 2, the HCI 31 to enable or disable the extended feedback register 2.

A feedback switch register corresponding to the processor core 32-n may alternatively be referred to as a UFS transfer protocol transfer request list interrupt enable (UFS transfer protocol transfer request list interrupt enable for core n, UTRLIE_C_n) register for a core n.

In this implementation, each processor core can flexibly control a manner of feeding back the interrupt information. For example, when the processor core 32-1 has a high requirement on interrupt response efficiency, the processor core 32-1 may invoke, by using the feedback switch register 1, the HCI 31 to enable the corresponding extended feedback register 1. When the processor core 32-1 has a low requirement on interrupt response efficiency, the processor core 32-1 may invoke, by using the feedback switch register 1, the HCI 31 to disable the corresponding extended feedback register 1, and the HCI 31 may feed back the interrupt information 1 by using the protocol feedback register according to the UFS protocol.

It should be noted that a quantity of feedback switch registers in the HCI 31 may alternatively be less than a quantity of processor cores. That is, a part of processor cores in the N processor cores may also have a function of invoking the HCI 31 to enable or disable a corresponding extended feedback register. In this implementation, a part of processor cores can flexibly control a manner of feeding back the interrupt information and a structure of the HCI 31 is simplified.

4. Completion Notification Register

As described above, the interrupt information may indicate that the SDS 33 completes execution of one piece of instruction information. However, a speed of delivering instruction information by the processor core is usually greater than a speed of executing the instruction information by the SDS 33. That is, the processor core may receive one piece of interrupt information only after continuously invoking the HCI 31 to deliver instruction information for several times. In this case, the processor core cannot determine which instruction information corresponds to the interrupt information.

In view of this, in this embodiment of this application, the HCI 31 further includes N completion notification registers (a completion notification register 1 to a completion notification register N), and the N completion notification registers respectively correspond to the N processor cores. Each completion notification register indicates completed instruction information of SDS 33. In this embodiment of this application, a completion notification register of the processor core 32-n may alternatively be referred to as a UFS transfer protocol transfer request list completion notification register (UFS transfer protocol transfer request list completion notification register for core n, UTRLCNR_C_n) for a core n.

Specifically, an extended feedback register 1, an extended doorbell register 1, and a completion notification register 1 are used as an example. The extended doorbell register 1 includes m invoking slots, the completion notification register includes m indication slots, and the m invoking slots are in a one-to-one correspondence with the m indication slots.

For example, it is assumed that the HCI 31 executes invocation received by the invoking slot 11, reads instruction information 1a from the storage unit 11 in the extended storage space 1 based on the invoking slot 11, and sends the instruction information 1a to the SDS 33. In a possible implementation, the HCI 31 further sends, to the SDS 33, identification information of the invoking slot 11.

After executing the instruction information 1a, the SDS 33 may report interrupt information to the HCI 31. In a possible implementation, the SDS 33 may further send the identification information of the invoking slot 11. In this way, the HCI 31 may set, based on the identification information of the invoking slot 11 and a correspondence between the invoking slot and the indication slot, an indication slot 11 corresponding to the invoking slot 11 in the completion notification register 1 to a level of 1, and feed back interrupt information to the processor core 32-1 by using the extended feedback register 1 (or the protocol feedback register).

After receiving the interrupt information, the processor core 32-1 may traverse the indication slot in the completion notification register 1. After reading that the indication slot 11 is at a level of 1, it may be determined that the SDS 33 completes execution of the instruction information 1a.

It should be noted that, in consideration of simplifying the structure of the HCI 31, a quantity of completion notification registers in the HCI 31 may be less than a quantity of processor cores. This is not limited in this embodiment of this application.

5. Clear Register

To enable the N processor cores in the processor 30 to more flexibly control the UFS interface, in a possible implementation, the HCI 31 may further include N clear registers, and the N clear registers respectively corresponds to the N processor cores. Any processor core may invoke, by using a corresponding clear register, the HCI 31 to indicate the SDS 33 to stop executing instruction information delivered by the processor core. A clear register corresponding to the processor core 32-$n$ may alternatively be referred to as a UFS transfer protocol transfer request list clear register (UFS transfer protocol transfer request list clear register for core n, UTRLCLR_C_n) for a core n.

For example, the processor core 32-1 and a clear register 1 are used as an example. The clear register 1 may include m clear slots. The m clear slots are in a one-to-one correspondence with m invoking slots in the extended doorbell register 1. As described above, it is assumed that the processor core 32-1 invokes, by the invoking slot 11, the HCI 31 to provide the instruction information 1$a$ for the SDS 33. When the processor core 32-1 needs the SDS 33 to stop executing the instruction information 1$a$, the processor core 32-1 may set a clear slot 11 corresponding to the invoking slot 11 to a level of 1.

After the clear slot 11 is set to the level of 1, the HCI 31 may obtain, based on the correspondence between the clear slot and the invoking slot, identification information of the invoking slot 11, and send a clear instruction to the SDS 33. The clear instruction includes the identification information of the invoking slot 11.

Because the HCI 31 provides the identification information of the invoking slot 11 together with the instruction information 1$a$ for the SDS 33, after receiving the clear instruction, the SDS 33 may stop executing the instruction information 1$a$ based on the identification information of the invoking slot 11 in the clear instruction.

In this implementation, each processor core can flexibly control an execution status of the instruction information. For example, when a piece of instruction information is not executed for a long time or execution of the instruction information is not completed for a long time, a processor core that delivers the instruction information may invoke, by using a corresponding clear register, the HCI 31 to indicate the SDS 33 to stop executing the instruction information.

It should be noted that, in consideration of simplifying the structure of the HCI 31, a quantity of clear registers in the HCI 31 may be less than a quantity of processor cores. This is not limited in this embodiment of this application.

6. Clear Switch Register

In a possible implementation, the HCI 31 may further include N clear switch registers, and the N clear switch registers are respectively in a one-to-one correspondence with the N processor cores. Each processor core may invoke, by using a corresponding clear switch register, the HCI 31 to enable or disable a corresponding clear register. For example, the processor core 32-1 may invoke, by using a clear switch register, the HCI 31 to enable or disable a clear register 1, and the processor core 32-2 may invoke, by using a clear switch register 2, the HCI 31 to enable or disable a clear register 2.

It should be noted that a quantity of clear switch registers in the HCI 31 may alternatively be less than a quantity of processor cores. That is, a part of processor cores in the N processor cores may also have a function of invoking the HCI 31 to enable or disable a corresponding clear register, to simplify a structure of the HCI 31.

7. Doorbell Switch Register

In a possible implementation, the HCI 31 may further include N doorbell switch registers, and the N doorbell switch registers are respectively in a one-to-one correspondence with the N processor cores. Each processor core may invoke, by using a corresponding doorbell switch register, the HCI to enable or disable a corresponding extended doorbell register. For example, the processor core 32-1 may invoke, by using a doorbell switch register, the HCI 31 to enable or disable the extended doorbell register 1, and the processor core 32-2 may invoke, by using a doorbell switch register 2, the HCI 31 to enable or disable the extended doorbell register 2.

A doorbell switch register corresponding to the processor cores 32-$n$ may alternatively be referred to as a UFS transfer protocol transfer request page table switch register (UFS transfer protocol transfer request list run-stop register for core n, UTRLRSR_C_n) register for a core n.

In this implementation, each processor core can flexibly control a manner of delivering the interrupt information. For example, when the processor core 32-1 has a high requirement on UFS access efficiency, the processor core 32-1 may invoke, by using the doorbell switch register 1, the HCI 31 to enable the corresponding extended doorbell register 1. When the processor core 32-1 has a low requirement on UFS access efficiency, the processor core 32-1 may invoke, by using the doorbell switch register 1, the HCI 31 to disable the corresponding extended doorbell register 1, and the processor core 32-1 may invoke, by using the protocol doorbell register, the HCI 31 to provide the instruction information 1 for the SDS 33 according to the specification of the UFS protocol.

In conclusion, the processor 30 provided in this embodiment of this application has a multi-core decoupling architecture shown in FIG. 3 and FIG. 5. Each processor core may independently extend a set of instruction information delivery channels (extended doorbell registers) and interrupt information reporting channels (extended feedback registers). In addition, registers related to the instruction information delivery channel and the interrupt information reporting channel may be further configured, such as a clear register, a completion notification register, a feedback switch register, and control logic corresponding to the foregoing controller.

As described above, a speed of executing instruction information by the SDS 33 is usually lower than a speed of delivering instruction information by a processor core. Therefore, there are usually a plurality of pieces of to-be-executed invocation in the HCI 31, and the invocation may come from a same processor core, or may come from different processor cores. Therefore, the HCI 31 often needs to arbitrate a plurality of pieces of to-be-executed invocation to determine subsequent invocation.

According to the foregoing extension of the doorbell register, that is, an extended doorbell register is additionally disposed in the HCI, an execution effect of the arbitration solution specified in the UFS protocol in the processor 30 provided in this embodiment of this application is not ideal. The foregoing arbitration solution mainly refers to a solution used by the HCI to determine to-be-executed invocation subsequently. In view of this, this embodiment of this application further provides the following several arbitration solutions that adapt to the processor 30. In a working process of the processor 30, any one of the following arbitration solutions may be used to determine to-be-executed invocation subsequently. For example, Arbitration Solution 1

As described above, each extended doorbell register may include a plurality of invoking slots. In a possible implementation, a plurality of invoking slots in the extended doorbell register correspond to priorities. For any extended doorbell register, when a plurality of invoking slots in the extended doorbell register receive invocation, the HCI 31 may sequentially execute, based on priorities corresponding to the plurality of invoking slots that receive invocation, invocation received by the plurality of invoking slots.

The extended doorbell register 1 in FIG. 4 is used as an example. It is assumed that priorities of an invoking slot 10 to an invoking slot 17 are in ascending order. When both the invoking slot 11 and the invoking slot 17 in the extended doorbell register 1 receive invocation of the processor core 32-1, the HCI 31 preferentially executes invocation received by the invoking slot 17.

In a possible implementation, a priority corresponding to each invoking slot may be unchanged. In another possible implementation, a priority corresponding to each invoking slot may also dynamically change. For example, a priority may be allocated to each invoking slot based on a time at which each invoking slot receives invocation. For example, a priority of an invoking slot that receives invocation earlier is higher, and a priority of an invoking slot that receives invocation later is lower.

In a possible implementation, when the HCI 31 further includes a protocol register, a plurality of invoking slots in the protocol doorbell register may also correspond to priorities. The HCI 31 sequentially executes, based on the priorities respectively corresponding to the plurality of invoking slots in the protocol doorbell register, invocation received by the invoking slots.

Arbitration Solution 2

In another possible implementation, the HCI 31 may alternatively poll a plurality of invoking slots in the extended doorbell register. The extended doorbell register 1 in FIG. 4 is used as an example. The HCI 31 may sequentially poll a plurality of invoking slots in the extended doorbell register 1 starting from a start invoking slot in the extended doorbell register 1.

The polling may be understood as that the HCI 31 sequentially queries whether each invoking slot in the doorbell register 1 receives invocation. For example, the HCI 31 may sequentially query each invoking slot in a direction from an invoking slot 10 to an invoking slot 17, and after the invoking slot 17 is found, return to the invoking slot 10, and continue to cyclically query each invoking slot until it is found that any invoking slot receives invocation.

The start invoking slot may be a next invoking slot of a last queried invoking slot when the HCI 31 polls the extended doorbell register 1 last time. For example, if the HCI 31 finally queries for the invoking slot 12 when polling the extended doorbell register 1 last time, the HCI 31 may use the invoking slot 13 as the start invoking slot when polling the extended doorbell register 1 this time, and sequentially query each invoking slot in a direction from the invoking slot 13 to the invoking slot 17. It should be noted that, after the invoking slot 17 is found in the first query, return to the invoking slot 10, and continue to cyclically query the invoking slot 10 to the invoking slot 17. Details are not described herein again.

When the HCI 31 polls the extended doorbell register 1, after determining that any invoking slot receives invocation (for example, the any invoking slot is at a level of 1), the HCI 31 may execute invocation received by the any invoking slot. For example, in a process of polling the extended doorbell register 1, if the HCI 31 determines that invocation is received by the invoking slot 15, the HCI 31 executes invocation received by the invoking slot 15.

It may be understood that, after the HCI 31 executes invocation received by the invoking slot 15, the HCI 31 may continue a next polling of the extended doorbell register 1. When the next polling of extended doorbell register 1 is performed, a next invoking slot of the invoking slot 15, that is, the invoking slot 16, may be used as a start invoking slot.

Arbitration Solution 3

The foregoing arbitration solution 1 and arbitration solution 2 are arbitration solutions for arbitration between a plurality of invoking slots inside an extended doorbell register. It may be understood that different extended doorbell registers may also receive invocation simultaneously. Therefore, arbitration between extended doorbell registers further needs to be performed.

In a possible implementation, a plurality of extended doorbell registers in the HCI 31 may alternatively correspond to priorities. When the plurality of extended doorbell registers receive invocation, the HCI 31 may further sequentially execute, in descending order of priorities, invocation received by the plurality of extended doorbell registers.

For example, in FIG. 4, priorities of the extended doorbell register 1 to the extended doorbell register 8 are in ascending order. When both the extended doorbell register 8 and the extended doorbell register 7 receive invocation the HCI 31 preferentially executes invocation received by the extended doorbell register 8.

In a possible implementation, when the HCI 31 further includes a protocol doorbell register, a priority of the protocol doorbell register is higher than that of the extended doorbell register.

It may be understood that the arbitration solution 3 provided in this embodiment of this application may be combined with the arbitration solution 1 or the arbitration solution 2. For example, an arbitration solution that combines the arbitration solution 1 and the arbitration solution 3 provided in this embodiment of this application may be shown in FIG. 6.

Each extended doorbell register includes eight invocation slots. The protocol doorbell register has the highest priority, and priorities of an invoking slot 00 to an invoking slot 031 in the protocol doorbell register are in ascending order. Priorities of the extended doorbell register 1 to the extended doorbell register N are in ascending order, and priorities of an invoking slot n0 to an invoking slot n7 in each extended doorbell register are in ascending order. n indicates a number of the extended doorbell register, and a value of n ranges from 1 to N. In this case, priorities of all invoking slots may be gradually decreased in a direction shown by an arrow in FIG. 6.

Figure 6:
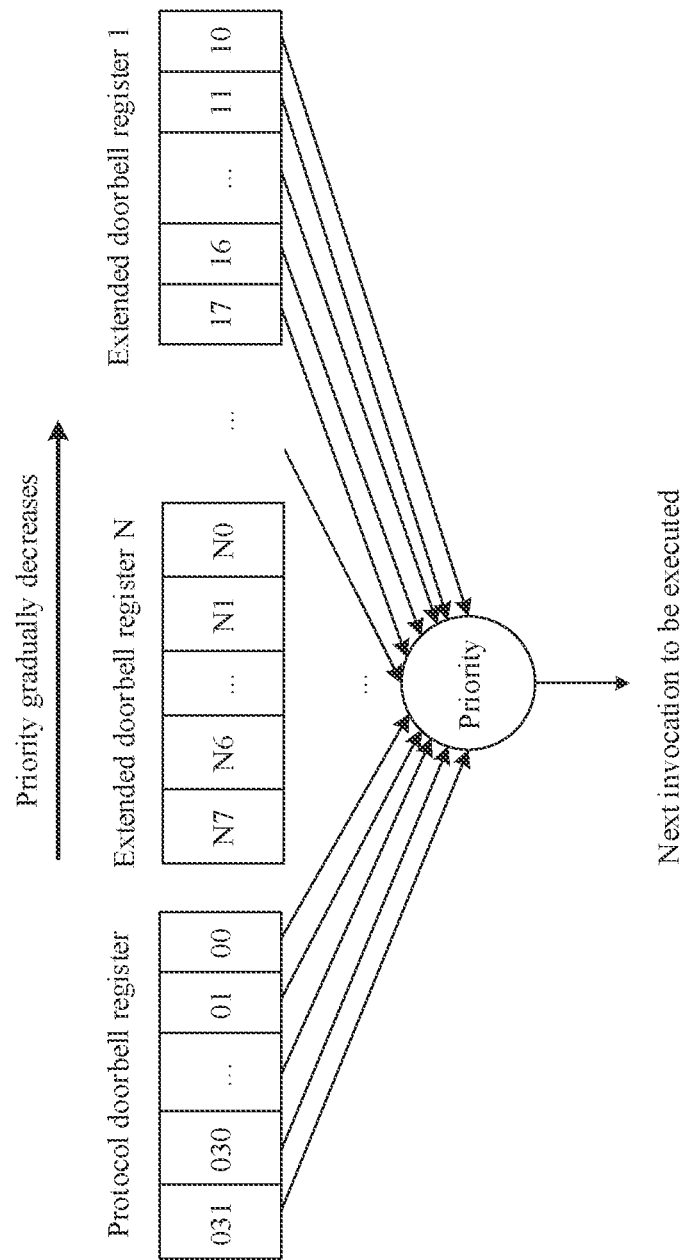
FIG. 6 is a schematic diagram 1 of an arbitration solution according to an embodiment of this application.

When a plurality of invoking slots in all the invoking slots receive invocation, the HCI 31 may sequentially execute, based on a priority sequence shown by arrows in FIG. 6, invocation received by the plurality of invoking slots. The plurality of slots that receive invocation may be in a same doorbell register, or may in different doorbell registers.

Figure 7:
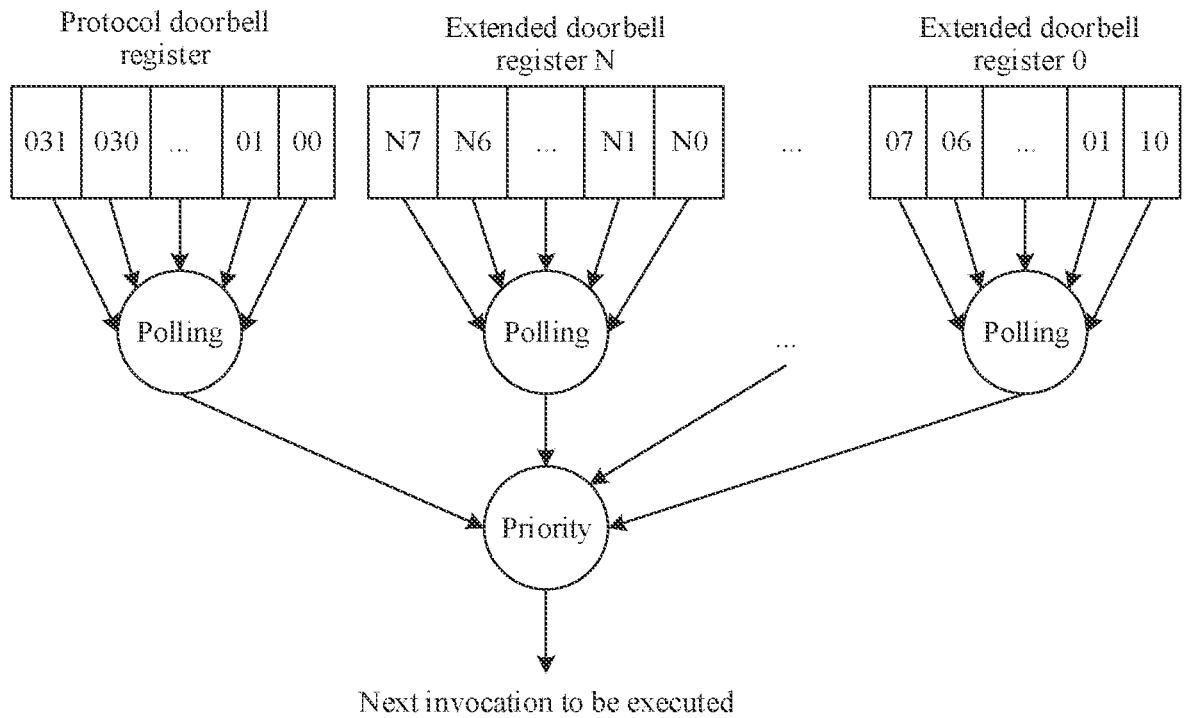
FIG. 7 is a schematic diagram 2 of an arbitration solution according to an embodiment of this application.

For another example, when the arbitration solution 2 is combined with the arbitration solution 3, an obtained arbitration solution may be shown in FIG. 7. The extended doorbell register 1 to the extended doorbell register N respectively correspond to priorities. For example, priorities of the extended doorbell register 1 to the extended doorbell register N are in ascending order.

The HCI 31 may separately poll the extended doorbell register 1 to the extended doorbell register N according to the arbitration solution 2. When only one extended doorbell register is polled for invocation at any time, invocation received by the extended doorbell register is executed. When a plurality of extended doorbell registers are polled for invocation at any moment, invocation polled from an extended doorbell register with a higher priority is preferentially executed.

In a possible implementation, the HCI 31 may further include a protocol doorbell register. In this case, a highest priority may be configured for the protocol doorbell register. The HCI 31 may also poll a plurality of invoking slots in the protocol doorbell register by using the arbitration solution 2. When the protocol doorbell register and any other extended doorbell register are polled for invocation at any time, invocation polled from the protocol doorbell register is preferentially executed.

Arbitration Solution 4

Figure 8:
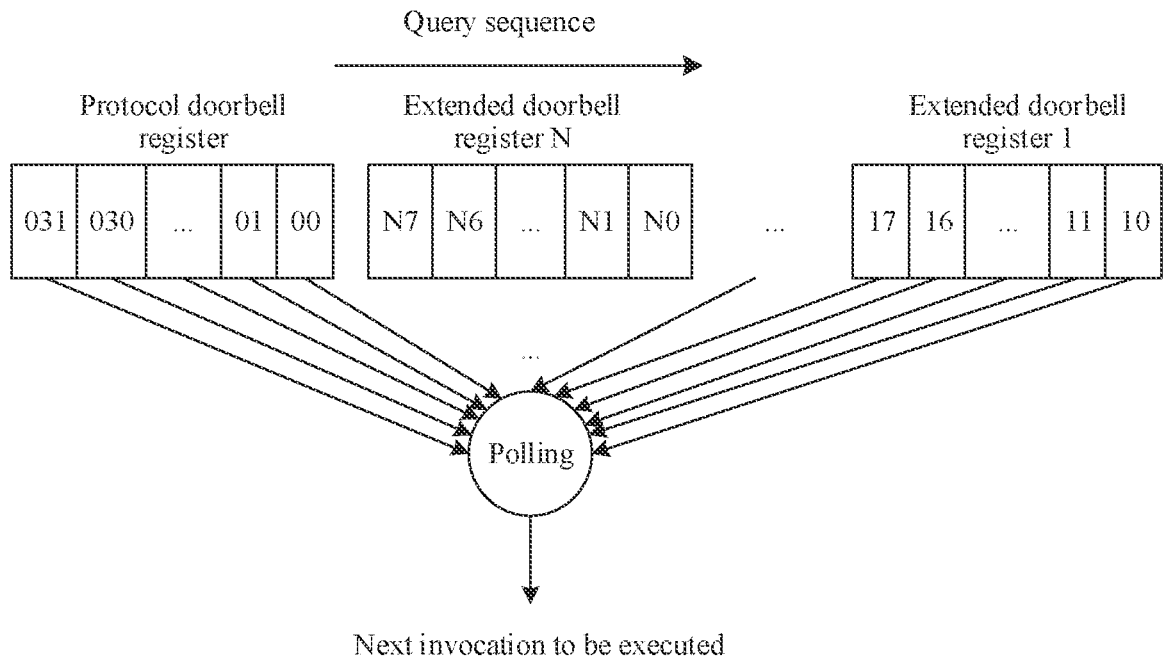
FIG. 8 is a schematic diagram 3 of an arbitration solution according to an embodiment of this application.

It may be understood that the HCI 31 may further poll all invoking slots in the N extended doorbell registers. When the HCI 31 further includes a protocol doorbell register, all the invoking slots may further include an invoking slot in the protocol doorbell register. For example, the arbitration solution 4 provided in this embodiment of this application may be shown in FIG. 8. Each extended doorbell register includes eight, the protocol doorbell register includes 32 invoking slots, and all the invoking slots include 8N invoking slots in the N extended doorbell registers and 32 invoking slots in the protocol doorbell register.

The HCI 31 may sequentially poll all the invoking slots starting from a start invoking slot. The polling may be understood as that the HCI 31 sequentially queries each invoking slot. For example, as shown by an arrow in FIG. 8, the HCI 31 may sequentially query, in a sequence from an invoking slot 031 in the protocol doorbell register to an invoking slot 10 in the extended doorbell register 1, whether each invoking slot receives invocation. After the invoking slot 10 is found, return to query the invoking slot 031, and continue to cyclically query each invoking slot until it is found that any invoking slot receives invocation.

The start invoking slot may be a next invoking slot of a last queried invoking slot when the HCI 31 polls all invoking slots last time. For example, when the HCI 31 polls all the invoking slots last time, the HCI 31 finally queries for an invoking slot N7. In this case, when the HCI 31 polls all the invoking slots this time, the HCI 31 may use a next invoking slot, that is, an invoking slot N6, as a start invoking slot. It should be noted that, after the invoking slot 10 is found in the first query, return to the invoking slot 031, and continue to cyclically query the invoking slot 031 to the invoking slot 10. Details are not described herein again.

After it is determined that any invoking slot receives invocation, the HCI 31 executes invocation received by the any invoking slot. For example, when the HCI 31 determines that invocation is received by an invoking slot 030, the HCI 31 executes invocation received by the invoking slot 030. It may be understood that, after the HCI 31 executes invocation received by the invoking slot 030, the HCI 31 may continue a next polling of all the invoking slots. When the next polling of all the invoking slots is performed, a next invoking slot of the invoking slot 030, that is, an invoking slot 029, may be used as a start invoking slot.

Arbitration Solution 5

In a possible implementation, when a plurality of invoking slots in all invoking slots receive invocation, the HCI 31 may further sequentially execute, based on a time sequence in which the plurality of invoking slots separately receive invocation, invocation separately received by the plurality of invoking slots. The plurality of invoking slots that receive invocation may be in a same doorbell register, or may be in different doorbell registers. Meanings of all invoking slots are similar to those in the arbitration solution 4, and details are not described herein again.

Specifically, the HCI 31 may allocate a corresponding timestamp to an invoking slot that receives invocation, and the HCI 31 may perform arbitration based on timestamps corresponding to different invoking slots. Generally, an invoking slot with an earlier timestamp has a higher weight (priority), and the HCI 31 may preferentially execute invocation received by the invoking slot with an earlier timestamp. For example, if an invoking slot N17 receives invocation earlier than an invoking slot 00, a weight allocated by the HCI 31 to the slot N17 is higher than a weight allocated to the slot 00, and the HCI 31 preferentially execute invocation received by the slot N17.

In a possible implementation, a plurality of invoking slots may receive invocation simultaneously. In this case, polling may be further performed on the plurality of invoking slots. Specifically, each of all the invoking slots corresponds to a sorting order, and the sorting order is equivalent to a query sequence of the HCI 31, as shown by an arrow in FIG. 9.

When a plurality of invoking slots receive invocation simultaneously, the HCI 31 may further preferentially execute invocation received by a first invoking slot. The first invoking slot is an invoking slot that is in the plurality of invoking slots and that is closest to a sorting order of a start invoking slot. The start invoking slot is a next invoking slot of an invoking slot corresponding to invocation last executed by the HCI. It should be noted that, according to the sorting order shown in FIG. 9, a next invoking slot of the invoking slot 10 is the invoking slot 031.

For example, it is assumed that N is an integer greater than 2. After the HIC 31 executes invocation received by an invoking slot N1, it is determined that current weights of an invoking slot 031, an invoking slot 20 (located in the extended doorbell register 2), and an invoking slot 17 are all maximum weights. In this case, the start invoking slot is a next invoking slot of the invoking slot N1, that is, the invoking slot NO.

Figure 9:
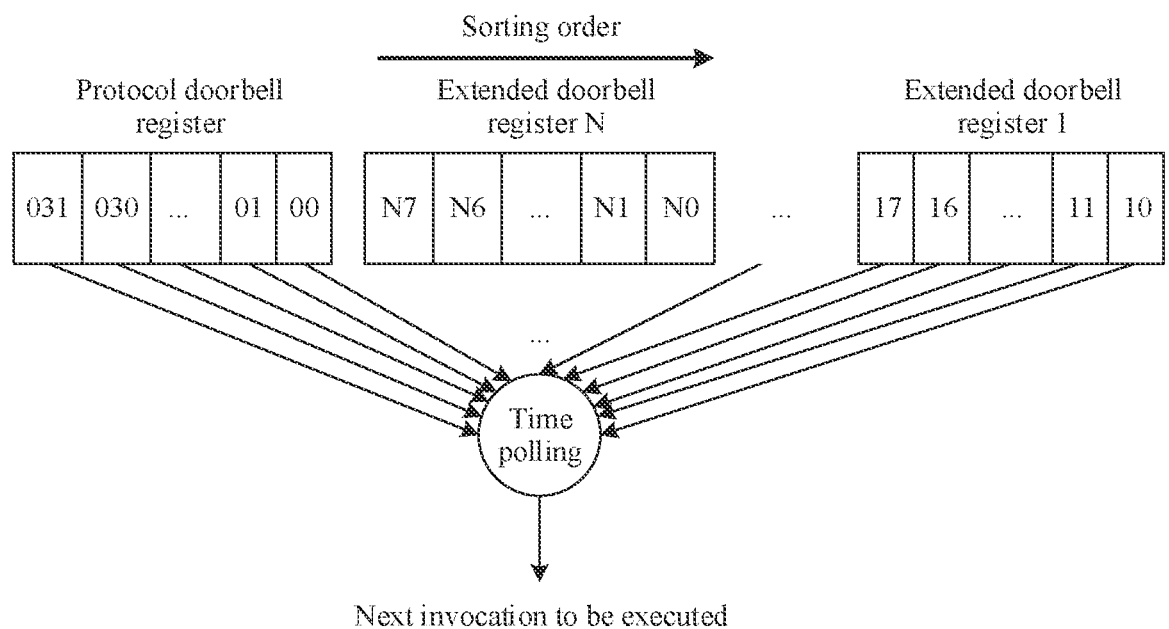
FIG. 9 is a schematic diagram 4 of an arbitration solution according to an embodiment of this application.

According to the sorting order shown in FIG. 9, it can be seen from a comparison of quantities of spaced invoking slots between the invoking slot 031, the invoking slot 20, and the invoking slot 17 and the invoking slot NO respectively. The invoking slot 20 is an invoking slot closest to the invoking slot NO, that is, the invoking slot 20 is the first invoking slot. Therefore, the HCI 31 executes invocation received by the invoking slot 20.

It may be understood that, after the HCI 31 executes invocation received by the invoking slot 20, weights of the invoking slot 031 and invoking the slot 17 are maximum weights. In this case, the invoking slot 17 is a start invoking slot, and it may be determined that the invoking slot 17 is the first invoking slot, and the HCI 31 may execute invocation received by the invoking slot 17.

After the HCI 31 executes invocation received by the invoking slot 17, only a weight of the invoking slot 031 is the maximum weight. Therefore, the HCI 31 may continue to execute invocation received by the invoking slot 031.

Based on a same technical concept, an embodiment of this application further provides a UFS control method. The method may be applied to any processor provided in embodiments of this application. For example, the processor mainly includes a first processor core, a second processor core, a host controller register HCI, and a service delivery subsystem SDS. The HCI includes a first extended doorbell register and a second extended doorbell register. The method mainly includes: The first processor core may invoke, by using the first extended doorbell register, the HCI to provide first instruction information for the SDS, and the second processor core may invoke, by using the second extended doorbell register, the HCI to provide second instruction information for the SDS.

It should be noted that, in this embodiment of this application, the processor may include a plurality of processor cores. The first processor core may be any one of the plurality of processor cores, and the second processor core may be any one of the plurality of processor cores other than the first processor core. The HCI may further include a plurality of extended doorbell registers, and the plurality of extended doorbell registers are in a one-to-one correspondence with the plurality of processor cores. The first extended doorbell register may be an extended doorbell register corresponding to the first processor core, and the second extended doorbell register may be an extended doorbell register corresponding to the second processor core.

To improve interrupt feedback efficiency, in a possible implementation, the HCI further includes a first extended feedback register and a second extended feedback register. In this case, after the first processor core invokes, by using the first extended doorbell register, the HCI to provide the first instruction information for the SDS, the HCI may feed back first interrupt information to the first processor core by using the first extended feedback register after the SDS completes execution of the first instruction information. After the second processor core invokes, by using the second extended doorbell register, the HCI to provide the second instruction information for the SDS, the HCI may feed back second interrupt information to the second processor core by using the second extended feedback register after the SDS completes execution of the second instruction information.

To enable the first processor core and the second processor core to flexibly control a manner of feeding back interrupt information, in a possible implementation, the HCI may further include a first feedback switch register and a second feedback switch register. In this case, the first processor core may invoke, by using the first feedback switch register, the HCI to enable or disable the first extended feedback register, and the second processor core may invoke, by using the second feedback switch register, the HCI to enable or disable the second extended feedback register.

To adapt to the first extended doorbell register and the second extended doorbell register, in a possible implementation, the first extended doorbell register may correspond to first extended storage space in a memory, and the second extended doorbell register may correspond to second extended storage space in the memory. In this case, when the first processor core invokes, by using the first extended doorbell register, the HCI to provide the first instruction information for the SDS, the first processor core may write the first instruction information into the first extended storage space. The HCI may read the first instruction information from the first extended storage space, and provide the first instruction information for the SDS. When the second processor core invokes, by using the second extended doorbell register, the HCI to provide the second instruction information for the SDS, the second processor core may write the second instruction information into the second extended storage space. The HCI may read the second instruction information from the second extended storage space, and provide the second instruction information for the SDS.

To be compatible with a UFS protocol, in a possible implementation, the processor may include a plurality of processor cores. The plurality of processor cores include the first processor core and the second processor core. The HCI may further include a protocol doorbell register. The memory may further include protocol storage space corresponding to the protocol doorbell register. In this case, the HCI may receive, by using the protocol doorbell register, invocation of any one of the plurality of processor cores. The HCI may read, from the protocol storage space based on invocation of the any processor core, instruction information written by the any processor core, and provide the read instruction information for the SDS.

It may be understood that the HCI can read the first instruction information and the second instruction information only by using address information of the first extended storage space and address information of the second extended storage space. Therefore, in a possible implementation, an address of the first extended storage space and an address of the second extended storage space are successively arranged after an address of the protocol storage space. The HCI further includes a protocol address register. The protocol address register is configured to store address information of the protocol storage space. In this case, when the HCI provides the first instruction information for the SDS, the HCI may obtain the address information of the first extended storage space through calculation based on the address information that is of the protocol storage space and that is stored in the protocol address register; read the first instruction information from the first extended storage space based on the address information of the first extended storage space; and provide the first instruction information for the SDS. When the HCI provides the second instruction information for the SDS, the HCI may obtain the address information of the second extended storage space through calculation based on the address information that is of the protocol storage space and that is stored in the protocol address register; read the second instruction information from the second extended storage space based on the address information of the second extended storage space; and provide the second instruction information for the SDS.

In another possible implementation, the HCI may further include a first extended address register and a second extended address register. The first extended address register is configured to store address information of the first extended storage space. The second extended address register is configured to store address information of the second extended storage space. In this case, when the HCI provides the first instruction information for the SD S, the HCI may read the first instruction information from the first extended storage space based on the address information that is of the first extended storage space and that is in the first extended address register, and provide the first instruction information for the SDS. When the HCI provides the second instruction information for the SDS, the HCI may read the second instruction information from the second extended storage space based on the address information that is of the second extended storage space and that is in the second extended address register, and provide the second instruction information for the SDS.

To enable the first processor core and the second processor core to more flexibly control an execution status of the instruction information, in a possible implementation, the HCI may further include a first clear register and a second clear register. In this case, the first processor core may invoke, by using the first clear register, the HCI to indicate the SDS to stop executing the first instruction information; and the second processor core may invoke, by using the second clear register, the HCI to indicate the SDS to stop executing the second instruction information.

According to the foregoing extension of the doorbell register, that is, an extended doorbell register is additionally disposed in the HCI, an execution effect of the arbitration solution specified in the UFS protocol in the processor provided in this embodiment of this application is not ideal. In view of this, this embodiment of this application further provides the following several arbitration solutions that adapt to the processor. In a working process of the processor, any one of the following arbitration solutions may be used to determine to-be-executed invocation subsequently. For example, Arbitration Solution 1

The first extended doorbell register may include a plurality of invoking slots, the plurality of invoking slots correspond to priorities, and each invoking slot may receive invocation. In this case, when a plurality of invoking slots in the first extended doorbell register receive invocation, the HCI may sequentially execute, based on priorities corresponding to the plurality of invoking slots that receive invocation, invocation received by the plurality of invoking slots.

Arbitration Solution 2

The first extended doorbell register may include a plurality of invoking slots, and each invoking slot may receive invocation. In this case, the HCI may sequentially poll the plurality of invoking slots of the first extended doorbell register starting from a start invoking slot of the first extended doorbell register; after it is determined that any invoking slot receives invocation, execute invocation received by the any invoking slot; and use a next invoking slot of the any invoking slot as the start invoking slot, and continue to sequentially poll the plurality of invoking slots of the first extended doorbell register.

Arbitration Solution 3

A priority of the first extended doorbell register is higher than a priority of the second extended doorbell register. In this case, when both the first extended doorbell register and the second extended doorbell register receive invocation, the HCI may first execute invocation received by the first extended doorbell register, and then execute invocation received by the second extended doorbell register.

It should be understood that the arbitration solution 3 is for arbitration between extended doorbell registers, and the arbitration solution 1 and the arbitration solution 2 are for arbitration between a plurality of invoking slots inside the extended doorbell registers. Therefore, the arbitration solution 3 can be combined with the arbitration solution 1 or the arbitration solution 2.

Arbitration Solution 4

The first extended doorbell register and the second extended doorbell register each may include a plurality of invoking slots, and each invoking slot may receive invocation. In this case, the HCI may sequentially poll all invoking slots starting from a start invoking slot. All the invoking slots include invoking slots in the first extended doorbell register and the second extended doorbell register. After it is determined that any invoking slot receives invocation, the HCI executes invocation received by the any invoking slot. The HCI uses a next invoking slot of the any invoking slot as the start invoking slot, and continues to sequentially poll all the invoking slots.

Arbitration Solution 5

The first extended doorbell register and the second extended doorbell register each may include a plurality of invoking slots, and each invoking slot may receive invocation. In this case, when a plurality of invoking slots in all invoking slots receive invocation, the HCI may sequentially execute, based on a time sequence in which the plurality of invoking slots separately receive invocation, invocation separately received by the plurality of invoking slots. All the invoking slots may include invoking slots in the first extended doorbell register and the second extended doorbell register.

In a possible implementation, each of all the invoking slots may correspond to a sorting order. In this case, when a plurality of invoking slots receive invocation simultaneously, the HCI may preferentially execute invocation received by a first invoking slot. The first invoking slot may be an invoking slot that is in the plurality of invoking slots and that is closest to a sorting order of a start invoking slot. The start invoking slot may be a next invoking slot of an invoking slot corresponding to invocation last executed by the HCI.

To enable the first processor core and the second processor core to more flexibly control a specific manner of delivering instruction information, in a possible implementation, the HCI may further include a first doorbell switch register and a second doorbell switch register. In this case, the first processor core may invoke, by using the first doorbell switch register, the HCI to enable or disable the first extended doorbell register, and the second processor core may invoke, by using the second doorbell switch register, the HCI to enable or disable the second extended doorbell register.

Based on a same technical concept, an embodiment of this application further provides a computer system. The computer system mainly includes the processor provided in any one of the foregoing embodiments and a UFS peripheral, and an SDS in the processor is coupled to the UFS peripheral. For example, the computer system may be an electronic device such as a personal computer, a mobile phone, or a tablet, or may be a module (or a module group) such as a computer main board. The UFS peripheral may be a flash memory, a memory card, or the like.

A person skilled in the art should understand that embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

The computer program instructions may alternatively be loaded onto a computer or another programmable data processing device, so that a series of operations and steps are performed on the computer or the another programmable device, so that computer-implemented processing is generated. Therefore, the instructions executed on the computer or the another programmable device provide steps for implementing a specific function in one or more procedures in the flowcharts and/or in one or more blocks in the block diagrams.

It is clear that a person skilled in the art can make various modifications and variations to this application without departing from the scope of this application. In this case, this application is intended to cover these modifications and variations of this application provided that they fall within the scope of protection defined by the following claims and their equivalent technologies.

What is claimed is:

1. A processor, comprising a first processor core, a second processor core, a host controller register (HCI), and a service delivery subsystem (SDS),
wherein the HCI comprises a first extended doorbell register and a second extended doorbell register,
wherein the first processor core is configured to invoke, by using the first extended doorbell register, the HCI to provide first instruction information for the SDS, and the first instruction information instructs the SDS to access a universal flash storage (UFS) peripheral, and
wherein the second processor core is configured to invoke, by using the second extended doorbell register, the HCI to provide second instruction information for the SDS,
wherein the HCI further comprises a first clear register and a second clear register,
wherein the first processor core is further configured to invoke, by using the first clear register, the HCI to indicate the SDS to stop executing the first instruction information, and
wherein the second processor core is further configured to invoke, by using the second clear register, the HCI to indicate the SDS to stop executing the second instruction information.

2. The processor according to claim 1, wherein:
the processor comprises a plurality of processor cores, the first processor core is one of the plurality of processor cores, and the second processor core is one of the plurality of processor cores other than the first processor core; and
the HCI comprises a plurality of extended doorbell registers, and the plurality of extended doorbell registers are in a one-to-one correspondence with the plurality of processor cores, wherein the first extended doorbell register is an extended doorbell register corresponding to the first processor core, and the second extended doorbell register is an extended doorbell register corresponding to the second processor core.

3. The processor according to claim 1, wherein:
the HCI further comprises a first extended feedback register and a second extended feedback register, and
the HCI is configured to:
after the SDS completes execution of the first instruction information, feed back first interrupt information to the first processor core by using the first extended feedback register; and
after the SDS completes execution of the second instruction information, feed back second interrupt information to the second processor core by using the second extended feedback register.

4. The processor according to claim 3, wherein:
the HCI further comprises a first feedback switch register and a second feedback switch register,
the first processor core is further configured to:
invoke, by using the first feedback switch register, the HCI to enable or disable the first extended feedback register, and
the second processor core is further configured to:
invoke, by using the second feedback switch register, the HCI to enable or disable the second extended feedback register.

5. The processor according to claim 1, wherein:
the first extended doorbell register corresponds to first extended storage space in a memory, and the second extended doorbell register corresponds to second extended storage space in the memory;
the first processor core is configured to write the first instruction information into the first extended storage space;
the HCI is configured to:
read the first instruction information from the first extended storage space, and
provide the first instruction information for the SDS;
the second processor core is configured to write the second instruction information into the second extended storage space; and
the HCI is further configured to:
read the second instruction information from the second extended storage space, and
provide the second instruction information for the SDS.

6. The processor according to claim 5, wherein:
the processor comprises a plurality of processor cores, the plurality of processor cores comprise the first processor core and the second processor core,
the HCI further comprises a protocol doorbell register, and
the memory further comprises protocol storage space corresponding to the protocol doorbell register, and
the HCI is further configured to:
receive, by using the protocol doorbell register, invocation of any one of the plurality of processor cores; and
read, from the protocol storage space based on invocation of the any processor core, instruction information written by the any processor core, and provide the read instruction information for the SDS.

7. The processor according to claim 6, wherein:
an address of the first extended storage space and an address of the second extended storage space are successively arranged after an address of the protocol storage space, and
the HCI further comprises a protocol address register, wherein the protocol address register is configured to store address information of the protocol storage space, and
the HCI is configured to:
obtain address information of the first extended storage space through calculation based on the address information that is of the protocol storage space and that is in the protocol address register, and read the first instruction information from the first extended storage space based on the address information of the first extended storage space; and
obtain address information of the second extended storage space through calculation based on the address information that is of the protocol storage space and that is in the protocol address register, and read the second instruction information from the second extended storage space based on the address information of the second extended storage space.

8. The processor according to claim 5, wherein:
the HCI further comprises a first extended address register and a second extended address register, the first extended address register is configured to store address information of the first extended storage space, and the second extended address register is configured to store address information of the second extended storage space, and
the HCI is configured to:
read the first instruction information from the first extended storage space based on the address information that is of the first extended storage space and that is in the first extended address register; and
read the second instruction information from the second extended storage space based on the address information that is of the second extended storage space and that is in the second extended address register.

9. A universal flash storage (UFS) control method, applied to a processor, wherein the processor comprises a first processor core, a second processor core, a host controller register (HCI), and a service delivery subsystem (SDS), wherein the HCI comprises a first extended doorbell register and a second extended doorbell register, and wherein the method comprises:
invoking, by the first processor core by using the first extended doorbell register, the HCI to provide first instruction information for the SDS, wherein the first instruction information instructs the SDS to access a universal flash storage (UFS) peripheral; and
invoking, by the second processor core by using the second extended doorbell register, the HCI to provide second instruction information for the SDS,
wherein the HCI further comprises a first clear register and a second clear register, and the method further comprises:
invoking, by the first processor core by using the first clear register, the HCI to indicate the SDS to stop executing the first instruction information; and invoking, by the second processor core by using the second clear register, the HCI to indicate the SDS to stop executing the second instruction information.

10. The method according to claim 9, wherein:
the processor comprises a plurality of processor cores, the first processor core is one of the plurality of processor cores, and the second processor core is one of the plurality of processor cores other than the first processor core; and
the HCI comprises a plurality of extended doorbell registers, and the plurality of extended doorbell registers are in a one-to-one correspondence with the plurality of processor cores, wherein the first extended doorbell register is an extended doorbell register corresponding to the first processor core, and the second extended doorbell register is an extended doorbell register corresponding to the second processor core.

11. The method according to claim 9, wherein the HCI further comprises a first extended feedback register and a second extended feedback register;
after the invoking, by the first processor core by using the first extended doorbell register, the HCI to provide first instruction information for the SDS, the method further comprises:
feeding back, by the HCI, first interrupt information to the first processor core by using the first extended feedback register after the SDS completes execution of the first instruction information; and
after the invoking, by the second processor core by using the second extended doorbell register, the HCI to provide second instruction information for the SDS, the method further comprises:
feeding back, by the HCI, second interrupt information to the second processor core by using the second extended feedback register after the SDS completes execution of the second instruction information.

12. The method according to claim 11, wherein the HCI further comprises a first feedback switch register and a second feedback switch register, and the method further comprises:
invoking, by the first processor core by using the first feedback switch register, the HCI to enable or disable the first extended feedback register; and
invoking, by the second processor core by using the second feedback switch register, the HCI to enable or disable the second extended feedback register.

13. The method according to claim 9, wherein:
the first extended doorbell register corresponds to first extended storage space in a memory, and the second extended doorbell register corresponds to second extended storage space in the memory;
the invoking, by the first processor core by using the first extended doorbell register, the HCI to provide first instruction information for the SDS comprises:
writing, by the first processor core, the first instruction information into the first extended storage space; and
reading, by the HCI, the first instruction information from the first extended storage space, and providing the first instruction information for the SDS; and
the invoking, by the second processor core by using the second extended doorbell register, the HCI to provide second instruction information for the SDS comprises:
writing, by the second processor core, the second instruction information into the second extended storage space; and reading, by the HCI, the second instruction information from the second extended storage space, and providing the second instruction information for the SDS.

14. The method according to claim 13, wherein the processor comprises a plurality of processor cores, the plurality of processor cores comprise the first processor core and the second processor core, the HCI further comprises a protocol doorbell register, the memory further comprises protocol storage space corresponding to the protocol doorbell register, and the method further comprises:
receiving, by the HCI by using the protocol doorbell register, invocation of any one of the plurality of processor cores; and
reading, by the HCI from the protocol storage space based on invocation of the any processor core, instruction information written by the any processor core, and providing the read instruction information for the SDS.

15. The method according to claim 14, wherein:
an address of the first extended storage space and an address of the second extended storage space are successively arranged after an address of the protocol storage space;
the HCI further comprises a protocol address register, wherein the protocol address register is configured to store address information of the protocol storage space;
the providing, by the HCI, first instruction information for the SDS comprises:
obtaining, by the HCI, address information of the first extended storage space through calculation based on the address information that is of the protocol storage space and that is in the protocol address register; and
reading, by the HCI, the first instruction information from the first extended storage space based on the address information of the first extended storage space, and providing the first instruction information for the SDS; and
the providing, by the HCI, second instruction information for the SDS comprises:
obtaining, by the HCI, address information of the first extended storage space through calculation based on the address information that is of the protocol storage space and that is in the protocol address register; and
reading, by the HCI, the second instruction information from the second extended storage space based on the address information of the first extended storage space, and providing the second instruction information for the SDS.

16. The method according to claim 13, wherein:
the HCI further comprises a first extended address register and a second extended address register, the first extended address register is configured to store address information of the first extended storage space, and the second extended address register is configured to store address information of the first extended storage space;
the providing, by the HCI, first instruction information for the SDS comprises:
reading, by the HCI, the first instruction information from the first extended storage space based on the address information that is of the first extended storage space and that is in the first extended address register, and providing the first instruction information for the SDS; and
the providing, by the HCI, second instruction information for the SDS comprises:
reading, by the HCI, the second instruction information from the second extended storage space based on address information that is of the second extended storage space and that is in the second extended address register, and providing the second instruction information for the SDS.

17. A computer system, comprising a processor and a universal flash storage (UFS) peripheral, wherein the processor comprises a first processor core, a second processor core, a host controller register (HCI), and a service delivery subsystem (SDS),
wherein the SDS in the processor is coupled to the UFS peripheral,
wherein the HCI comprises a first extended doorbell register and a second extended doorbell register,
wherein the first processor core is configured to invoke, by using the first extended doorbell register, the HCI to provide first instruction information for the SDS, and the first instruction information instructs the SDS to access the UFS peripheral, and
wherein the second processor core is configured to invoke, by using the second extended doorbell register, the HCI to provide second instruction information for the SDS,
wherein the HCI further comprises a first clear register and a second clear register,
wherein the first processor core is further configured to invoke, by using the first clear register, the HCI to indicate the SDS to stop executing the first instruction information, and
wherein the second processor core is further configured to invoke, by using the second clear register, the HCI to indicate the SDS to stop executing the second instruction information.

18. The computer system according to claim 17, wherein:
the processor comprises a plurality of processor cores, the first processor core is one of the plurality of processor cores, and the second processor core is one of the plurality of processor cores other than the first processor core; and
the HCI comprises a plurality of extended doorbell registers, and the plurality of extended doorbell registers are in a one-to-one correspondence with the plurality of processor cores, wherein the first extended doorbell register is an extended doorbell register corresponding to the first processor core, and the second extended doorbell register is an extended doorbell register corresponding to the second processor core.

19. The computer system according to claim 17, wherein:
the HCI further comprises a first extended feedback register and a second extended feedback register, and the HCI is configured to:
after the SDS completes execution of the first instruction information, feed back first interrupt information to the first processor core by using the first extended feedback register; and
after the SDS completes execution of the second instruction information, feed back second interrupt information to the second processor core by using the second extended feedback register.

20. The computer system according to claim 17, wherein:
the first extended doorbell register corresponds to first extended storage space in a memory, and the second extended doorbell register corresponds to second extended storage space in the memory;
the first processor core is configured to write the first instruction information into the first extended storage space;

the HCI is configured to:
　read the first instruction information from the first extended storage space, and
　provide the first instruction information for the SDS;
the second processor core is configured to write the second instruction information into the second extended storage space; and
the HCI is further configured to:
　read the second instruction information from the second extended storage space, and
　provide the second instruction information for the SDS.

\* \* \* \* \*